US011948718B2

(12) United States Patent
Hosokawa et al.

(10) Patent No.: US 11,948,718 B2
(45) Date of Patent: Apr. 2, 2024

(54) REACTOR

(71) Applicant: Mitsubishi Electric Corporation, Tokyo (JP)

(72) Inventors: Atsushi Hosokawa, Tokyo (JP); Takashi Kumagai, Tokyo (JP); Tomohito Fukuda, Tokyo (JP); Kenji Nishizaka, Tokyo (JP); Shohei Higashitani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 609 days.

(21) Appl. No.: 17/260,673

(22) PCT Filed: Sep. 11, 2019

(86) PCT No.: PCT/JP2019/035734
§ 371 (c)(1),
(2) Date: Jan. 15, 2021

(87) PCT Pub. No.: WO2020/066631
PCT Pub. Date: Apr. 2, 2020

(65) Prior Publication Data

US 2021/0327630 A1 Oct. 21, 2021

(30) Foreign Application Priority Data

Sep. 28, 2018 (JP) ................................. 2018-184720

(51) Int. Cl.
*H01F 3/14* (2006.01)
*H01F 27/02* (2006.01)
(Continued)

(52) U.S. Cl.
CPC ............. *H01F 27/24* (2013.01); *H01F 27/02* (2013.01); *H01F 27/28* (2013.01)

(58) Field of Classification Search
CPC .......... H01F 27/24; H01F 27/02; H01F 27/28; H01F 27/085; H01F 27/306; H01F 3/14;
(Continued)

(56) References Cited

U.S. PATENT DOCUMENTS

2012/0126928 A1* 5/2012 Yoshikawa ............. H01F 37/00 336/221
2012/0326831 A1* 12/2012 Suzuki .................. H01F 27/263 336/233
(Continued)

FOREIGN PATENT DOCUMENTS

JP 2000182844 A 6/2000
JP 2005302900 A 10/2005
(Continued)

OTHER PUBLICATIONS

First Office Action dated Mar. 7, 2022, issued in corresponding Chinese Patent Application No. 201980058625.4, 13 pages including 7 pages of English Translation.
(Continued)

*Primary Examiner* — Mang Tin Bik Lian
(74) *Attorney, Agent, or Firm* — BUCHANAN INGERSOLL & ROONEY PC

(57) ABSTRACT

Inside a first case outer frame portion as an outer frame of the first case, a plurality of first core pieces and a partition to separate a pair of adjacent first core pieces among the plurality of first core pieces are disposed. The first case has a shape capable of accommodating at least a part of the second core piece. The first case outer frame portion includes a first case accommodating portion as a portion of the first case outer frame portion that is capable of accommodating the plurality of first core pieces, and a first case cover portion to cover a space inside the first case accommodating portion.

18 Claims, 19 Drawing Sheets

(51) Int. Cl.
*H01F 27/24* (2006.01)
*H01F 27/28* (2006.01)

(58) Field of Classification Search
CPC ........ H01F 27/266; H01F 27/263; H01F 5/02; H01F 27/325; H01F 27/324
See application file for complete search history.

(56) References Cited

U.S. PATENT DOCUMENTS

| | | | | |
|---|---|---|---|---|
| 2015/0318097 | A1* | 11/2015 | Pagenkopf | H01F 3/14 336/20 |
| 2016/0322152 | A1* | 11/2016 | Ohashi | H01F 17/06 |
| 2020/0312542 | A1* | 10/2020 | Hirabayashi | H01F 27/255 |
| 2020/0381171 | A1* | 12/2020 | Sakaguchi | H01F 27/24 |
| 2021/0005374 | A1* | 1/2021 | Schulze | H01F 27/02 |

FOREIGN PATENT DOCUMENTS

| | | | |
|---|---|---|---|
| JP | 2009-246221 | * | 10/2009 |
| JP | 2009246221 | A | 10/2009 |
| JP | 2011082410 | A | 4/2011 |
| JP | 2013143454 | A | 7/2013 |
| JP | 2014-027088 | * | 2/2014 |
| JP | 2014027088 | A | 2/2014 |
| JP | 2014036157 | A | 2/2014 |
| JP | 2016119365 | A | 6/2016 |
| JP | 2016171137 | A | 9/2016 |

OTHER PUBLICATIONS

Notice of Reasons for Refusal dated Apr. 5, 2022, issued in corresponding Japanese Patent Application No. 2020-548399, 10 pages including 5 pages of English Translation.
International Search Report (with English Translation) and Written Opinion issued in corresponding International Patent Application No. PCT/JP2019/035734, 11 pages, dated Nov. 26, 2019.
Office Action dated Oct. 4, 2022, in corresponding Japanese Patent Application No. 2020-548399 and English translation of the Office Action. (12 pages).

* cited by examiner

REACTOR

TECHNICAL FIELD

The present invention relates to a reactor, and particularly to a reactor including a plurality of first core pieces and a partition.

BACKGROUND ART

In recent years, size reduction and higher output of power conversion devices have been increasingly demanded. In general, it is known that a reactor included in a power conversion device can be reduced in size by increasing a switching frequency of a semiconductor element included in the power conversion device. However, the increased frequency increases losses occurring in a core included in the reactor.

For dealing with such a problem, cores need to be formed of a material causing fewer losses. When such a material is used, however, gaps are provided in a magnetic path formed of the core in order to obtain desired electrical characteristics. In other words, a magnetic path is formed of a plurality of core pieces, and a gap is provided between a pair of adjacent core pieces among the plurality of core pieces in the magnetic path. Such a gap between a pair of adjacent core pieces is called a core gap. In Japanese Patent Laying-Open No. 2016-171137 (PTL 1), for example, a cylindrical intervening member for holding a core piece included in a reactor is filled with a mold material or the like. This improves the productivity in a process of manufacturing a reactor.

CITATION LIST

Patent Literature

PTL 1: Japanese Patent Laying-Open No. 2016-171137

SUMMARY OF INVENTION

Technical Problem

In the reactor disclosed in Japanese Patent Laying-Open No. 2016-171137, a plurality of inner core pieces are spaced at a core gap from each other. Each of the plurality of inner core pieces is gripped by an intervening member disposed in each core gap. The assembly of the plurality of inner core pieces and the intervening members is further installed in an outer core piece. The assembly formed in this way is further placed inside a mold, into which a mold resin is introduced and hardened therein. The problem is that the reactor manufactured in the procedure as described above takes time to complete.

The present invention has been made in view of the above-described problems. An object of the present invention is to provide a readily producible reactor that includes a plurality of core pieces disposed at a distance from each other to thereby achieve desired electrical characteristics.

Solution to Problem

A reactor according to the present invention includes a first case, a plurality of first core pieces, a second core piece, and a coil. The first case is shaped as a part of a closed loop. The plurality of first core pieces are disposed inside the first case. The second core piece is disposed to form a closed magnetic path together with the first core pieces inside the first case, the closed magnetic path having a closed loop shape. The coil is wound around the closed magnetic path. Inside a first case outer frame portion as an outer frame of the first case, the first core pieces and a partition to separate a pair of adjacent first core pieces among the first core pieces are disposed.

A reactor according to the present invention includes a first case, a plurality of first core pieces, a second core piece, and a coil. The first case is shaped as a part of a closed loop. The first core pieces are disposed inside the first case. The second core piece is disposed to form a closed magnetic path together with the first core pieces inside the first case, the closed magnetic path having a closed loop shape. The coil is wound around the closed magnetic path. Inside a first case outer frame portion as an outer frame of the first case, the first core pieces and a partition to separate a pair of adjacent first core pieces among the first core pieces are disposed. The first case has a shape capable of accommodating at least a part of the second core piece. The first case outer frame portion includes a first case accommodating portion as a portion of the first case outer frame portion that is capable of accommodating the first core pieces, and a first case cover portion to cover a space inside the first case accommodating portion.

A reactor according to the present invention includes a first case, a plurality of first core pieces, a second core piece, and a coil. The first case is shaped as a part of a closed loop. The first core pieces are disposed inside the first case. The second core piece is disposed to form a closed magnetic path together with the first core pieces inside the first case, the closed magnetic path having a closed loop shape. The coil is wound around the closed magnetic path. Inside a first case outer frame portion as an outer frame of the first case, the first core pieces and a partition to separate a pair of adjacent first core pieces among the first core pieces are disposed. At a first end portion of the first case in a first direction in which the first core pieces are arranged, at least a part of the second core piece is accommodated inside the first case so as to extend in a second direction intersecting the first direction. The first case is provided with an opening through which the second core piece is introduced and removed. The opening is located in at least one of outermost portions of the first case that are adjacent to a second end portion in the second direction in the second core piece accommodated inside the first case. The first case outer frame portion includes a first case accommodating portion as a portion of the first case outer frame portion that is capable of accommodating the first core pieces, and a first case cover portion to cover a space inside the first case accommodating portion.

Advantageous Effects of Invention

According to the present invention, a reactor can be readily provided that includes a first case outer frame portion and a first core piece and a partition inside the first case outer frame portion to thereby achieve desired electrical characteristics.

DESCRIPTION OF EMBODIMENTS

Hereinafter, embodiments of the present invention will be described with reference to the accompanying drawings.

First Embodiment

Figure 1:
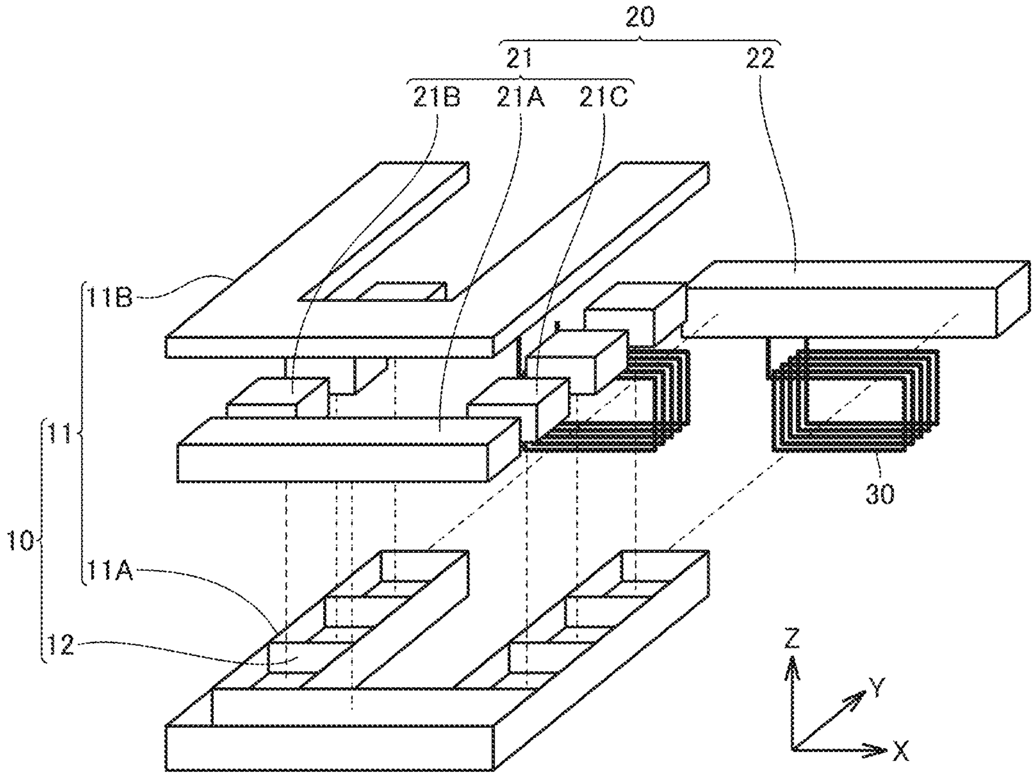
FIG. 1 is a schematic perspective view showing a manner in which members included in a reactor according to the first example of the first embodiment are arranged.
Figure 2:
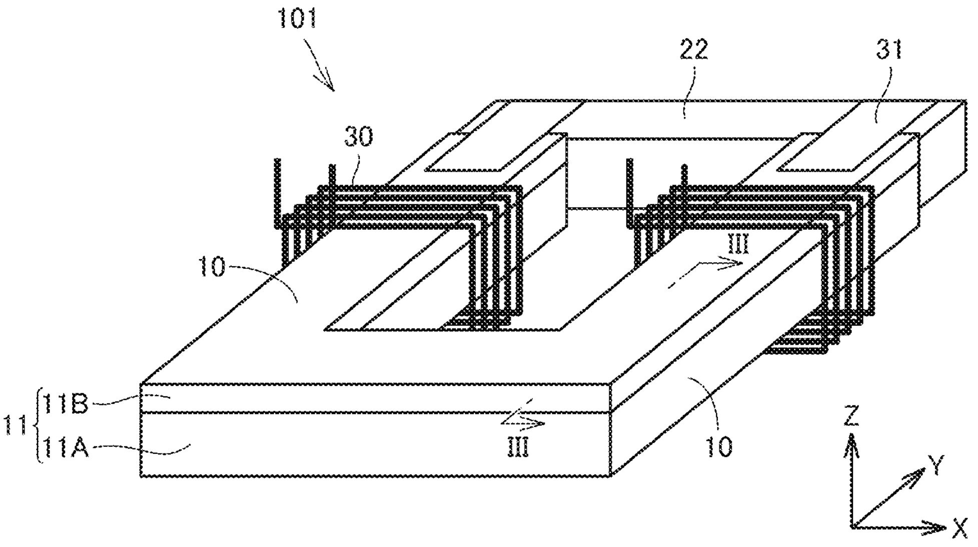
FIG. 2 is a schematic perspective view showing an external appearance of a completed reactor according to the first example of the first embodiment.

First, a reactor of the first example of the present embodiment will be described with reference to FIGS. 1 to 3. For convenience of description, an X direction, a Y direction, and a Z direction are introduced. Specifically, the X direction extends in the horizontal direction, the Y direction extends in the depth direction, and the Z direction extends in the vertical direction. FIG. 1 is a schematic perspective view showing a manner in which members included in a reactor according to the first example of the first embodiment are arranged. FIG. 2 is a schematic perspective view showing an external appearance of a completed reactor according to the first example of the first embodiment. In other words, FIG. 2 shows a completed assembly of the members arranged as shown in FIG. 1.

Referring to FIGS. 1 and 2, a reactor 101 according to the first example of the first embodiment mainly includes a first case 10, a core piece 20, and a coil 30. First case 10 is shaped as a part of a closed loop formed by core piece 20 of reactor 101 or a part of a closed magnetic path having a closed loop shape. Specifically, in a plan view, first case 10 has a portion extending in the X direction and a portion extending in the Y direction. First case 10 has a portion extending in the X direction that is bent at one end portion and the other end portion on the opposite side thereof in the X direction and extends therefrom toward the positive side in the Y direction. In other words, first case 10 has one portion extending in the X direction and two portions each extending in the Y direction from a bend at each of both end portions of this one portion. Also in other words, first case 10 has a U-shape in a plan view. In first case 10, two portions extending in the Y direction each has an end portion that is located on the opposite side of the portion extending in the X direction and that is opened without being connected to anywhere.

First case 10 has a first case outer frame portion 11 as an outer frame having a hollow space therein in which core piece 20 and the like can be accommodated. In other words, first case outer frame portion 11 is a housing portion forming first case 10. First case outer frame portion 11 includes a first case accommodating portion 11A and a first case cover portion 11B. First case accommodating portion 11A and first case cover portion 11B correspond to first case outer frame portion 11, i.e., a housing portion of first case 10. Thus, each of first case accommodating portion 11A and first case cover portion 11B has: one portion extending in the X direction; and two portions each extending in the Y direction from a bend at each of both end portions of this one portion. In other words, first case accommodating portion 11A and first case cover portion 11B each have a U-shape in a plan view. First case accommodating portion 11A is a main body portion of first case outer frame portion 11 capable of accommodating core piece 20, as will be described later. First case cover portion 11B covers a portion of first case accommodating portion 11A, for example, which is located at the uppermost portion in the Z direction in FIG. 1 and through which the inner wall surface of first case accommodating portion 11A is exposed to the outside. By covering with first case cover portion 11B, the inner wall surface of first case accommodating portion 11A and core piece 20 inside first case accommodating portion 11A cannot be visually seen from outside, as shown in FIG. 2.

A plurality of partitions 12 are disposed inside first case outer frame portion 11. Thus, first case 10 includes first case outer frame portion 11 and partition 12. Partition 12 is disposed as a wall surface that separates a pair of adjacent core pieces 20 among a plurality of core pieces 20 (described later) accommodated inside first case accommodating portion 11A. Inside each of two portions of first case accommodating portion 11A that extend in the Y direction, a plurality of partitions 12 are disposed at a distance from each other in the Y direction. One core piece 20 is disposed in each region sandwiched between a pair of partitions 12 adjacent to each other in the Y direction among the plurality of partitions 12.

Core piece 20 includes a plurality of first core pieces 21 and a second core piece 22. The plurality of first core pieces 21 are disposed inside first case 10. In other words, in reactor 101, the plurality of first core pieces 21 are accommodated inside first case accommodating portion 11A.

More specifically, as shown in FIG. 1, the plurality of first core pieces 21 include a single first core piece 21A, a plurality of first core pieces 21B, and a plurality of first core pieces 21C. As shown in FIG. 1, single first core piece 21A is accommodated in a portion inside first case accommodating portion 11A, in which first case outer frame portion 11 as first case 10 extends in the X direction. Thus, first core piece 21A has an elongated rectangular parallelepiped shape, for example. Partition 12 is disposed between a portion in which first case accommodating portion 11A extends in the X direction and a portion in which first case accommodating portion 11A extends in the Y direction. Partition 12 serves to separate first core piece 21A inside first case accommodating portion 11A at a distance from other first core pieces 21B and the like.

On the other hand, as shown in FIG. 1, the plurality of first core pieces 21B and the plurality of first core pieces 21C each have a rectangular parallelepiped shape: having a dimension in the X direction and a dimension in the Y direction that are substantially equal or slightly different; and having a length shorter than the extending length of first core piece 21A. The plurality of first core pieces 21B and the plurality of first core pieces 21C each are accommodated in a portion inside first case accommodating portion 11A in which first case outer frame portion 11 as first case 10 extends in the Y direction. In FIG. 1, first core pieces 21B are accommodated in a portion extending in the Y direction on the left side in the X direction in first case outer frame portion 11. First core pieces 21C are accommodated in a portion extending in the Y direction on the right side in the X direction in first case outer frame portion 11.

As described above, the plurality of partitions 12 are disposed at a distance from each other in the Y direction in a portion extending in the Y direction in first case accommodating portion 11A. The plurality of first core pieces 21B, 21C disposed in a portion extending in the Y direction in first case accommodating portion 11A are separated at a distance from each other in the Y direction by partitions 12 each disposed between a pair of adjacent first core pieces 21 among these first core pieces 21B, 21C. In other words, a pair of adjacent first core pieces 21B separated by partition 12 face each other with a gap interposed therebetween in the Y direction and a pair of adjacent first core pieces 21C separated by partition 12 face each other with a gap interposed therebetween in the Y direction.

As described above, partition 12 serves to separate a pair of adjacent first core pieces 21A, 21B, 21C from each other among the plurality of first core pieces 21A, 21B, 21C inside first case outer frame portion 11, i.e., inside first case accommodating portion 11A. First case accommodating portion 11A of first case outer frame portion 11 is a portion of first case outer frame portion 11 that is capable of accommodating the plurality of first core pieces 21A, 21B, 21C. First case cover portion 11B of first case outer frame portion 11 is a portion of first case outer frame portion 11 that covers a space inside first case accommodating portion 11A. Thus, in reactor 101, first core piece 21 is sandwiched between first case accommodating portion 11A and first case cover portion 11B particularly in the Z direction. By sandwiching first core piece 21 between first case accommodating portion 11A and first case cover portion 11B in this manner, first core piece 21 can be readily held so as to prevent first core piece 21 from moving from first case outer frame portion 11.

In FIG. 1, one first core piece 21A is provided, whereas three first core pieces 21B are disposed in a portion where first case outer frame portion 11 on the left side extends in the Y direction. Also in FIG. 1, three first core pieces 21C are disposed in a portion where first case outer frame portion 11 on the right side extends in the Y direction. However, the number of first core pieces 21 is not limited to the above. The number of each of first core pieces 21A, 21B and 21C accommodated inside first case outer frame portion 11, and the size of each of first core pieces 21A, 21B and 21C can be changed from those in FIG. 1. For example, only first core pieces 21C may be changed in number and size from those in FIG. 1. However, even in the case where the number and the size are changed in this way, the gap between first core pieces 21, i.e., a core gap, in the case in FIG. 1 is preferably set such that the total sum of the dimensions of the core gaps in the direction along the extending direction of the closed magnetic path is substantially equal to the total sum of the dimensions of the core gaps between first core pieces 21 changed in number or size.

Second core piece 22 is disposed outside first case 10. Second core piece 22 is disposed to form a closed magnetic path having a closed loop shape, together with the plurality of first core pieces 21 inside first case 10. In other words, second core piece 22 has an elongated rectangular parallelepiped shape formed to extend in the X direction so as to connect open end portions in two portions extending in the Y direction in first case 10.

The entire core piece 20 is formed of second core piece 22 disposed as described above and the plurality of first core pieces 21A, 21B, 21C inside first case accommodating portion 11A. The entire core piece 20 constituted of first core pieces 21A, 21B, 21C and second core piece 22 forms a closed loop-shaped rectangle that is substantially annular in a plan view as long as any core gap portion cut out by partition 12 is ignored. Thus, the entire core piece 20 constituted of first core pieces 21A, 21B, 21C and second core piece 22 forms a closed magnetic path.

In FIG. 1, each of first core pieces 21A to 21C and second core piece 22 has a rectangular parallelepiped shape having substantially right-angled corner portions. However, when reactor 100 needs to be reduced in size or weight, each corner portion of the entire assembly of first core pieces 21A to 21C and second core piece 22 may have a shape other than a right angle within a range in which the electrical characteristics are not influenced thereby. For example, each corner portion in the above-mentioned entire assembly may have a so-called C-plane shape having a plane arranged at an angle of 45° with respect to a right angle. Alternatively, each corner portion mentioned above may have a spherical shape that is a so-called R-plane shape. In this case, as the shape of core piece 20 is changed in this way, each corner portion of first case 10, i.e., first case outer frame portion 11, is also similarly deformed into a C-plane shape or an R-plane shape.

In reactor 101, first core pieces 21A, 21B, and 21C are accommodated in first case 10, whereas second core piece 22 is disposed so as to be exposed to the outside of the case. First case outer frame portion 11 of first case 10 in which first core pieces 21A, 21B, and 21C are accommodated and second core piece 22 are fixed by a fixing member 31.

Coil 30 is wound around a part of core piece 20 as a closed magnetic path. More specifically, coil 30 is wound around portions of first case outer frame portion 11 that accommodate first core pieces 21B, 21C extending in the Y direction. As a result, one turn of the wound coil 30 is disposed to extend along a cross section intersecting the Y direction. Coil 30 is disposed so as to be wound, from outside, around each of portions of first case outer frame portion 11 that accommodate first core pieces 21B, 21C. FIG. 2 schematically shows coil 30 wound around first case outer frame portion 11 in a rectangular shape. Without being limited thereto, however, coil 30 may be wound around first case outer frame portion 11 in a circular shape or an elliptical shape. When coil 30 such as an edgewise coil having high mechanical strength is used, it is preferable that the size and the shape of the cross section of the space surrounded by the winding of coil 30 and located inside coil 30 is close as much as possible to the size and the shape of the cross section of first case outer frame portion 11 around which coil 30 is wound. Thereby, when coil 30 wound around the outside of first case outer frame portion 11 is inserted, coil 30 wound from outside holds first case accommodating portion 11A and first case cover portion 11B to be sandwiched from the upper and lower sides and from the left and right sides. Accordingly, coil 30 can fix first case accommodating portion 11A and first case cover portion 11B.

In reactor 101, first case 10 has a U-shape in a plan view. Thus, in reactor 101, first case 10 has two portions extending in the Y direction. From the outside of each of these two portions extending toward the positive side in the Y direction, coil 30 is wound around each of these two portions. Two wound coils 30 are connected in series or in parallel. When these two coils 30 are connected in series, the inductance value of each coil 30 can be increased. On the other hand, when these two coils 30 are connected in parallel, loss occurring in these coils 30 can be reduced. According to the electrical characteristics required by reactor 100, it is selected whether to connect two coils 30 in series or in parallel.

Figure 3:
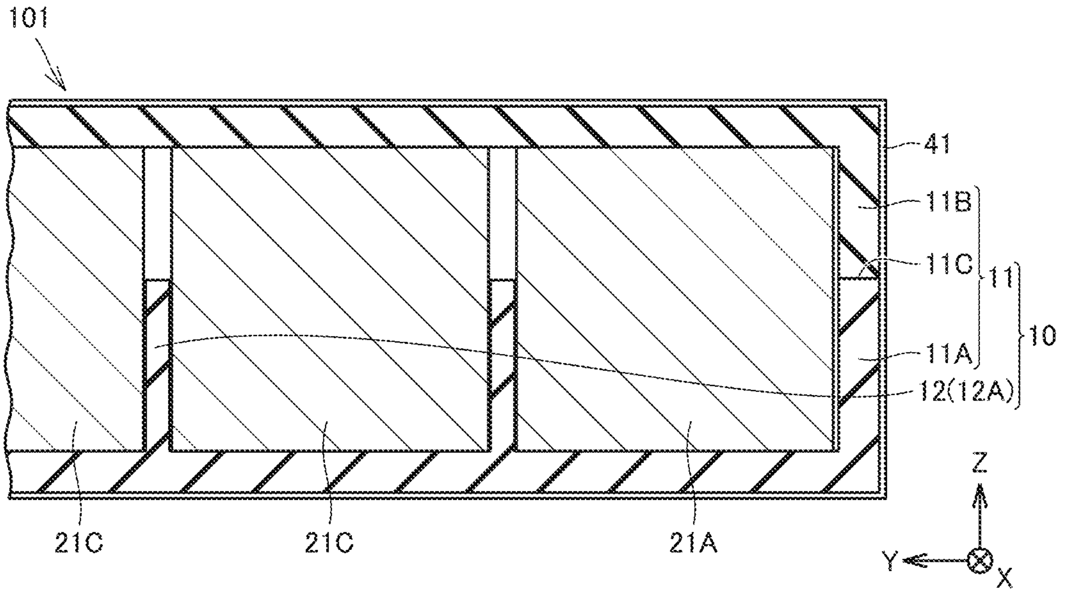
FIG. 3 is a schematic cross-sectional view of a portion taken along a line in FIG. 2.

FIG. 3 is a schematic cross-sectional view of a portion taken along a line in FIG. 2. In other words, FIG. 3 shows the state of a part inside first case 10 in the completed state as reactor 101. Referring to FIG. 3, in reactor 101, first case 10 is formed by integrating: first case outer frame portion 11 capable of accommodating a plurality of first core pieces 21; and a first case partition portion 12A as partition 12 disposed inside first case outer frame portion 11.

In other words, in reactor 101, partition 12 is formed integrally with a portion of first case outer frame portion 11 serving as a housing of first case 10. Particularly in reactor 101, first case partition portion 12A as partition 12 is formed integrally with first case accommodating portion 11A. In other words, in FIG. 3, a plurality of first case partition portions 12A formed integrally with first case accommodating portion 11A are formed in a part of the container-shaped inner accommodating hollow portion of first case accommodating portion 11A, for example, such that first case partition portions 12A are spaced apart from each other in the Y direction. First core pieces 21A, 21B, and 21C each are disposed in a portion sandwiched between a pair of first case partition portions 12A adjacent to each other in the Y direction among the plurality of first case partition portions 12A. Since FIG. 3 is a cross-sectional view showing a portion of first case 10 extending in the Y direction on the right side in FIG. 2, the figure shows first core piece 21A and first core pieces 21C. However, for example, in the cross-sectional view showing a portion of first case 10 extending in the Y direction on the left side in FIG. 2, first core piece 21A and first core piece 21B appear.

By forming partition 12 integrally with first case accommodating portion 11A in this way, partition 12 can be molded integrally with first case accommodating portion 11A. Thus, both of the members can be formed in the same process. Therefore, the number of components of reactor 101 can be reduced, and the manufacturing cost can be reduced.

In FIG. 3, first case accommodating portion 11A and first case cover portion 11B have substantially the same size in a plan view. Thus, when first case cover portion 11B is placed over first case accommodating portion 11A as shown in FIG. 3, first case accommodating portion 11A and first case cover portion 11B come into contact with each other at a first case contact portion 11C. Then, a case fixing member 41 is wound from outside around the entire first case outer frame portion 11 configured as described above. Case fixing member 41 is preferably formed of an adhesive tape, for example.

Figure 4:
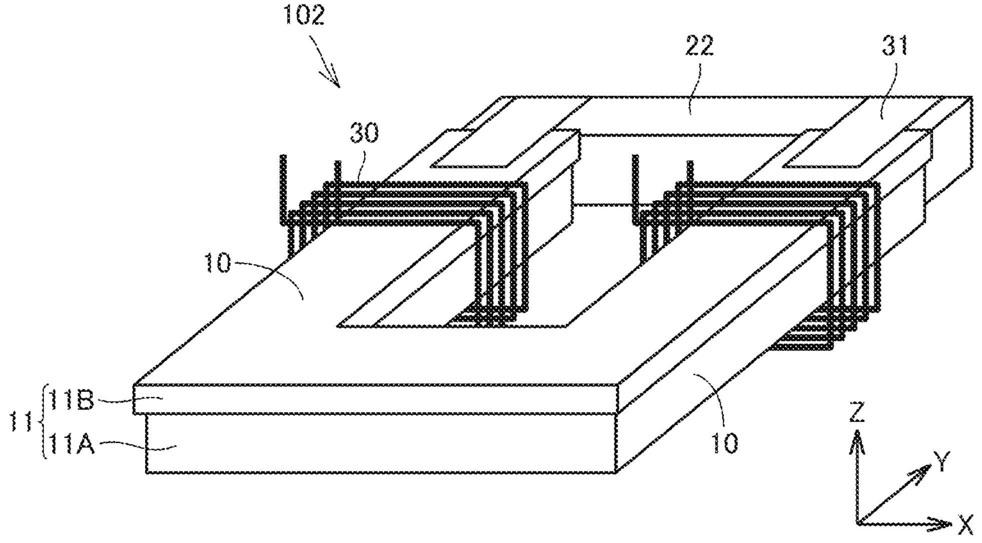
FIG. 4 is a schematic perspective view showing an external appearance of a completed reactor according to the second example of the first embodiment.
Figure 5:
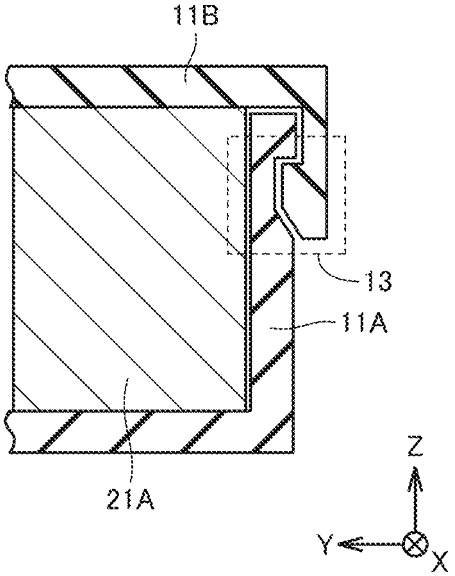
FIG. 5 is a schematic enlarged cross-sectional view showing an area of a fitting structure between a first case accommodating portion and a first case cover portion in the reactor in FIG. 4.

FIG. 4 is a schematic perspective view showing an external appearance of a completed reactor according to the second example of the first embodiment. FIG. 5 is a schematic enlarged cross-sectional view showing an area of a fitting structure between the first case accommodating portion and the first case cover portion in the reactor in FIG. 4. Referring to FIGS. 4 and 5, a reactor 102 according to the second example of the present embodiment has substantially the same configuration as that of reactor 101 according to the first example. Thus, the same components of reactor 102 as those of reactor 101 will be denoted by the same reference characters, and the description thereof will not be repeated. It should be noted that reactor 102 is different in size of first case cover portion 11B from reactor 101.

Specifically, in reactor 102, first case cover portion 11B is larger in size than first case accommodating portion 11A in a plan view. Thus, even when first case cover portion 11B is placed over first case accommodating portion 11A, first case contact portion 11C is not formed. Accordingly, in reactor 102, first case accommodating portion 11A and first case cover portion 11B are fitted by a fitting mechanism referred to as a so-called snap-fit structure 13, as shown in a region surrounded by a dotted line in FIG. 5. Thereby, the strength of fitting between first case accommodating portion 11A and first case cover portion 11B becomes higher in reactor 102 than in reactor 101. Also thereby, the vibration resistance of reactor 102 can be improved.

Figure 6:
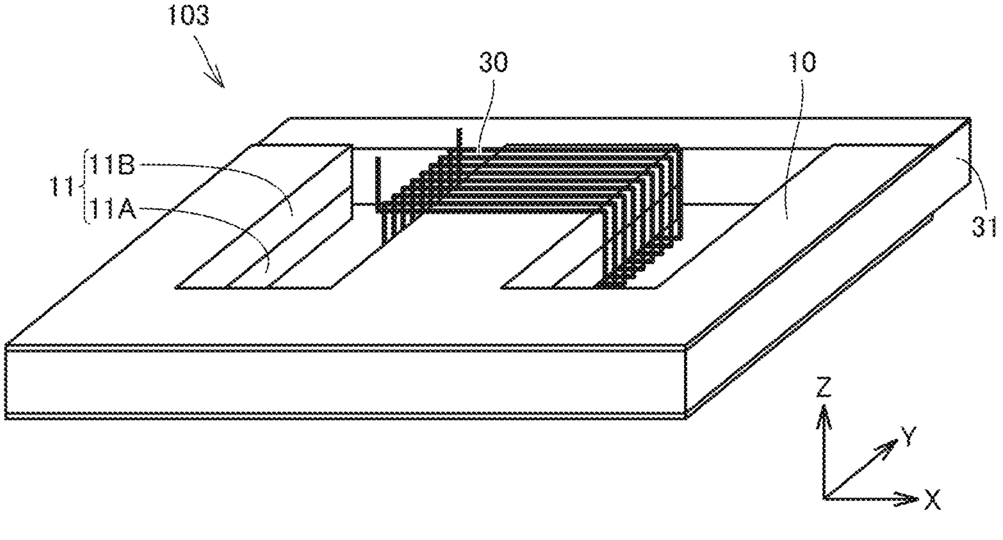
FIG. 6 is a schematic perspective view showing an external appearance of a completed reactor according to the third example of the first embodiment.

FIG. 6 is a schematic perspective view showing an external appearance of a completed reactor according to the third example of the first embodiment. Referring to FIG. 6, a reactor 103 according to the third example of the present embodiment has substantially the same configuration as that of reactor 101 according to the first example. Thus, the same components of reactor 103 as those of reactor 101 will be denoted by the same reference characters, and the description thereof will not be repeated. It should be noted that reactor 103 is different in planar shape of first case outer frame portion 11 from reactor 101.

Specifically, in a plan view, first case outer frame portion 11 as an outer frame of first case 10 in reactor 103 has a portion extending in the X direction and a portion extending in the Y direction. First case 10 has a portion extending in the X direction that is bent at one end portion and the other end portion on the opposite side thereof in the X direction and extends therefrom toward the positive side in the Y direction. Furthermore, first case 10 has a portion extending toward the positive side in the Y direction from a central portion of the portion extending in the X direction. In other words, reactor 103 is different in configuration from reactor 101 in that reactor 103 has a portion extending toward the positive side in the Y direction from the central portion of the portion extending in the X direction. In other words, first case 10 of reactor 103 has an E-shape in a plan view.

Also inside the portion of first case 10 that extends toward the positive side in the Y direction from the central position of the portion extending in the X direction in first case 10, a plurality of partitions 12 are provided at a distance from each other in the Y direction, as in FIG. 1. One first core piece 21 having the same size as those of first core pieces 21B, 21C is disposed between each pair of adjacent partitions 12 among the plurality of partitions 12. Each partition 12 is interposed to thereby provide a distance between the pair of first core pieces 21 adjacent to each other.

In FIG. 6, a fixing member 31 is attached so as to cover the outermost side surface of first case outer frame portion 11. Fixing member 31 is disposed so as to extend from outside around the outermost side surfaces of first case outer frame portion 11 and second core piece 22. Thus, first case outer frame portion 11 and second core piece 22 are fixed to each other. However, also in FIG. 6, fixing member 31 may be disposed in the same manner as in FIG. 1, i.e., so as to be affixed onto the end portion of first case outer frame portion 11 and the upper surface of second core piece 22. On the contrary, also in FIG. 1, fixing member 31 may be disposed in the same manner as in FIG. 6.

In reactor 103, coil 30 is wound from outside around a portion of first case 10 that extends toward the positive side in the Y direction from the central position of the portion extending in the X direction in first case 10. In contrast, coil 30 is not wound around a portion of first case 10 that extends to be bent toward the positive side in the Y direction from each of one end portion and the other end portion of the portion extending in the X direction in first case 10. In this way, in reactor 103, it is preferable that only a single coil 30 is wound around, for example, only first core piece 21 inside the central portion in the X direction among three portions extending in the Y direction.

Then, materials, sizes, and the like of the members constituting reactors 101 to 103 will be described.

Each of first case accommodating portion 11A and first case cover portion 11B constituting first case outer frame portion 11, and first case partition portion 12A as partition 12 is formed of a nonmagnetic material such as a resin. Specifically, the above-mentioned first case outer frame portion 11 and the like each are made of any one selected from the group consisting of polypropylene, ABS resin, polyethylene terephthalate (PET), polycarbonate (PC), polyamide (PA), polyphenylene sulfide (PPS), polybutylene terephthalate (PBT), liquid crystal polymer (LCP), fluorine, phenol, melamine, polyurethane, epoxy, and silicon.

First case outer frame portion 11 and the like may be molded by a generally applied method. In other words, first case outer frame portion 11 and the like are molded, for example, by injection molding or a method using a 3D printer.

In particular, partition 12 integrated with first case accommodating portion 11A of first case outer frame portion 11 preferably has a thickness of 1 mm or less in the Y direction. When partition 12 is too thick, the width of each core gap becomes excessively large. This leads to induction heating due to leakage magnetic flux and accompanying heat generation of coil 30. Thus, partition 12 is preferably formed as relatively thin as 1 mm or less.

On the other hand, the outermost frame body portion other than partition 12 in first case accommodating portion 11A of first case outer frame portion 11 may have any thickness. This is because this outermost frame body portion does not influence the electrical characteristics of reactor 101 and the like. Thus, this outermost frame body portion can have any thickness as long as the strength of first case outer frame portion 11 can be ensured.

Furthermore, in first case accommodating portion 11A, a rectangular space portion surrounded by the outermost frame body portion other than partition 12 and by each partition 12 preferably has a dimension of 5 mm or more and 200 mm or less in the X direction or the Y direction in a plan view. When the space portion is too small in size, the workability for inserting first core piece 21B or the like into this space portion deteriorates. This is because the distance between first core piece 21B or the like and first case outer frame portion 11 becomes relatively small, which makes it difficult to perform the operation of inserting first core piece 21B or the like, and also requires time for the operation. On the other hand, when the space portion is too large in size, first core piece 21B or the like inserted into the space portion tends to readily move inside first case accommodating portion 11A. This is because the distance between first core piece 21B or the like and first case outer frame portion 11 becomes relatively large. This is also because movement of first core piece 21B or the like inside first case accommodating portion 11A may unintentionally change the electrical characteristics of first core piece 21B or the like. From this viewpoint, with respect to the dimension in each of the X direction and the Y direction, the difference in dimension between each first core piece 21B and the space portion accommodating first core piece 21B is preferably equal to or less than 5% of the dimension of first core piece 21B in a corresponding one of the X direction and the Y direction. Thus, the variation of the inductance value as a representative item of the electrical characteristics of first core piece 21B and the like is about ±5% or less. The value of the variation satisfies generally defined performance conditions for each of reactors 101 to 103.

The dimension of first case accommodating portion 11A in the Z direction, i.e., the height of first case accommodating portion 11A, is preferably 273 or less of the dimension of core piece 20 in the Z direction that is to be accommodated therein.

This is because first case accommodating portion 11A having a dimension in the Z direction larger than the above-mentioned dimension requires core piece 20 to move by a deep length of first case accommodating portion 11A when core piece 20 is placed in first case accommodating portion 11A, with the result that the workability decreases.

Furthermore, core piece 20 including first core piece 21 and second core piece 22 and forming a closed magnetic path is made of the following materials. Core piece 20 is made of any material selected from the group consisting of a dust core, a ferrite core, an amorphous core, and a nano-crystalline core, each of which is a soft magnetic material. More specifically, when core piece 20 is made of a dust core, core piece 20 is made of any one selected from the group consisting of pure iron, an Fe—Si alloy, an Fe—Si—Al alloy, an Ni—Fe alloy, and an Ni—Fe—Mo alloy. Alternatively, when core piece 20 is made of a ferrite core, core piece 20 is made of an Mn—Zn alloy or an Ni—Zn alloy. The surface of core piece 20 may be coated with a powder resin. This allows electrical insulation between core piece 20 and other members.

Among the above-mentioned materials, in particular, a ferrite core is less resistant to impact, and may be chipped or cracked due to impact. However, ferrite core piece 20 is disposed inside first case 10 made of resin. Thus, even when core piece 20 moves in the space portion inside first case 10 due to impact from outside, an effect of protecting core piece 20 from damage can be expected to be achieved. Even when chipping or cracking occurs in core piece 20 made of a conductive material such as Mn—Zn-based ferrite, it becomes possible to reduce the possibility that a chipped portion or the like of core piece 20 is scattered toward an electronic substrate to cause a short circuit therein. This is because core piece 20 is disposed in a space portion inside first case 10.

Reactors 101 and 102 each having first case 10 formed in a U-shape in a plan view are substantially identical in terms of the shape and the cross-sectional area of the portion of core piece 20 forming a closed magnetic path, which intersects the direction of the magnetic path. In other words, first core pieces 21A, 21B, and 21C and second core piece 22 are substantially identical in terms of the shape and the cross-sectional area of the portion intersecting the direction of the magnetic path (the extending direction of the magnetic path formed by core piece 20). In contrast, in reactor 103 having first case 10 formed in an E-shape in a plan view, the cross-sectional area of the portion of core piece 20 forming a closed magnetic path, which intersects the direction of the magnetic path, is different among the regions. Specifically, first core pieces 21A to 21C are substantially identical in terms of the shape and the cross-sectional area of: a portion extending in the X direction in FIG. 6; and two portions on the left side and the right side in the X direction among three portions extending in the Y direction. The cross section of second core piece 22 that intersects the X direction along the extending direction of the magnetic path is substantially identical in shape and cross-sectional area to first core pieces 21A to 21C. On the other hand, first core piece 21B or first core piece 21C disposed at the center in the X direction among three portions extending in the Y direction in FIG. 6 has a dimension in the X direction that is about twice as large as those of first core piece 21 and second core piece 22 in other portions. As a result, first core piece 21B or first core piece 21C disposed at the center in the X direction among three portions extending in the Y direction in FIG. 6 has a cross-sectional area that is about twice as large as those of first core piece 21 and second core piece 22 in other portions.

The entire outer dimension of first case outer frame portion 11 is preferably 500 mm or less in each of the X direction and the Y direction. The entire dimension of first case outer frame portion 11 in the Z direction is preferably 100 mm or less.

In each of reactors 101 to 103, first core pieces 21A to 21C and second core piece 22 preferably have substantially the same dimension in the Z direction.

Furthermore, a current flows through coil 30. Thus, coil 30 is preferably formed of a material such as copper or aluminum having low electric resistivity. Coil 30 is formed of a conductive wire: that is formed as a relatively thick linear wire having a circular cross section intersecting its extending direction or a rectangular wire having a rectangular cross section; and that is wound around a portion extending in the Y direction in first case outer frame portion 11, for example. Alternatively, coil 30 may be formed by winding a sheet-like conductive material.

The conductive wire forming coil 30 is spirally wound around first case outer frame portion 11. Thus, coil 30 is wound such that each turn of coil 30 extends along a cross section intersecting the Y direction and such that a pair of turns are adjacent to each other in the Y direction. The conductive wire forming coil 30 is required to have a configuration that does not cause a short circuit between a pair of adjacent turns among the spirally wound turns. From this viewpoint, it is preferable that the surface of the conductive wire forming coil 30 is covered with an insulating coating or that insulating paper is wound around the surface of the conductive wire. The thickness of the insulating coating or the insulating paper is preferably 0.001 mm or more and 0.1 mm or less. This can suppress occurrence of a short circuit between a pair of adjacent turns of coil 30.

Then, a method of fixing core piece 20 inside first case accommodating portion 11A will be described with reference to FIGS. 7 to 10.

Figure 7:
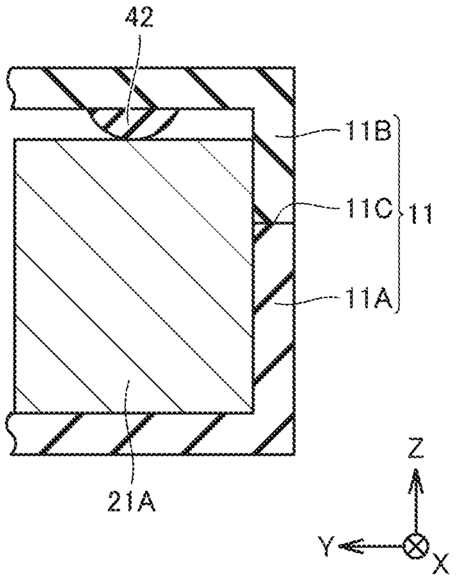
FIG. 7 is a schematic diagram showing the first example of a method of fixing a core piece inside the first case accommodating portion.

FIG. 7 is a schematic diagram showing the first example of a method of fixing a core piece inside the first case accommodating portion. Referring to FIG. 7, first core piece 21A and the like are disposed inside a region separated by partition 12 inside first case accommodating portion 11A, on which first case cover portion 11B is placed from above in the Z direction. In this case, a protrusion shape 42 is provided on the inner side of first case accommodating portion 11A of first case cover portion 11B, i.e., on the surface on the lower side in the Z direction in FIG. 7. Protrusion shape 42 protrudes downward in the Z direction. First case cover portion 11B is placed over first case accommodating portion 11A to close first case accommodating portion 11A. Thereby, protrusion shape 42 comes into contact with first core piece 21A from above to apply force to first core piece 21A from above to downward in the Z direction. Thus, by this force, first core piece 21A and the like are fixed inside first case accommodating portion 11A.

Figure 8:
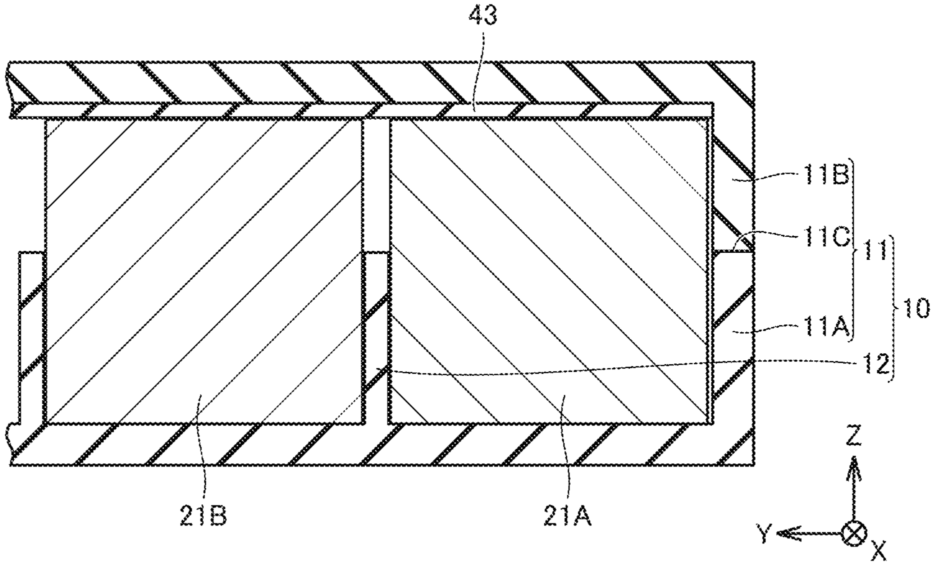
FIG. 8 is a schematic diagram showing the second example of the method of fixing the core piece inside the first case accommodating portion.

FIG. 8 is a schematic diagram showing the second example of the method of fixing the core piece inside the first case accommodating portion. Referring to FIG. 8, first core pieces 21A, 21B and the like are disposed inside the region separated by partition 12 inside first case accommodating portion 11A, on which first case cover portion 11B is placed from above in the Z direction. In this case, a buffer member 43 is provided on the side of first case cover portion 11B close to the inside of first case accommodating portion 11A, i.e., on the surface of first case cover portion 11B on the lower side in the Z direction in FIG. 8. Buffer member 43 is preferably formed of a nonmagnetic material. Buffer member 43 is preferably formed in a layered manner entirely on one of the surfaces of first case cover portion 11B on the lower side in the Z direction, but may be formed only on a part of this surface.

In FIGS. 7 and 8, first case cover portion 11B has substantially the same plane area as that of first case accommodating portion 11A, and a first case contact portion 11C is provided between first case cover portion 11B and first case accommodating portion 11A. However, the present invention is not limited to such an example. For example, even when first case cover portion 11B has a plane area larger than that of first case accommodating portion 11A, and first case cover portion 11B and first case accommodating portion 11A are fitted by snap-fit structure 13 (see FIG. 5), protrusion shape 42 or buffer member 43 similar to the above may be used.

The above description provides an example in which first case cover portion 11B covers the inside of first case accommodating portion 11A. However, the present invention is not limited to such an example, but first core piece 21 can be fixed inside first case accommodating portion 11A without first case cover portion 11B.

Figure 9:
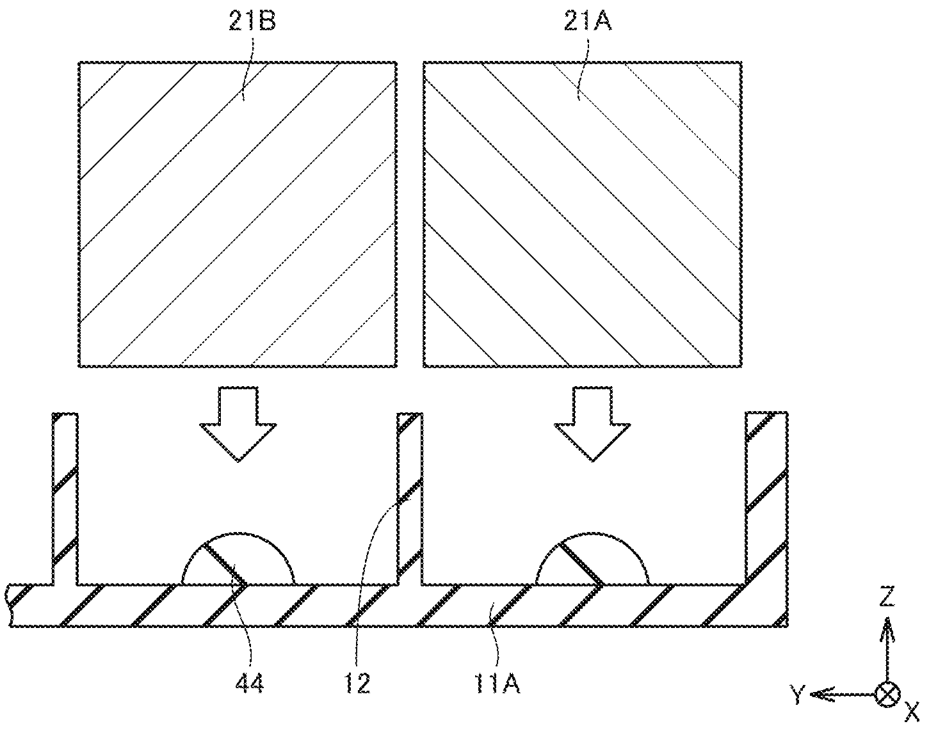
FIG. 9 is a schematic diagram showing the third example of the method of fixing the core piece inside the first case accommodating portion.

FIG. 9 is a schematic diagram showing the third example of the method of fixing the core piece inside the first case accommodating portion. Referring to FIG. 9, an adhesive agent 44 is disposed inside a region separated by partition 12 inside first case accommodating portion 11A. Specifically, adhesive agent 44 is applied onto the bottom surface of first case accommodating portion 11A inside the region separated by partition 12 inside first case accommodating portion 11A, onto which first core pieces 21A, 21B, and 21C and the like are placed from above in the Z direction, particularly inside the region separated by partition 12 inside first case accommodating portion 11A. Thereby, first core pieces 21A, 21B and the like are bonded to the bottom surface inside first case accommodating portion 11A. Thereby, first core piece 21 is fixed inside first case accommodating portion 11A. In this case, first case accommodating portion 11A and first core piece 21 can be fixed without first case cover portion 11B.

Referring to FIGS. 8 and 9, in the present embodiment, at least one of buffer member 43 and adhesive agent 44 is disposed inside first case outer frame portion 11. First case outer frame portion 11 and the plurality of first core pieces 21 are joined by at least one of buffer member 43 and adhesive agent 44. Thus, both buffer member 43 and adhesive agent 44 may be disposed inside first case outer frame portion 11. First case outer frame portion 11 and the plurality of first core pieces 21 may be joined by both buffer member 43 and adhesive agent 44. In this case, the inside of first case outer frame portion 11 includes both: the inside of first case accommodating portion 11A; and the surface of first case cover portion 11B on the lower side in the Z direction, which is placed over first case accommodating portion 11A so as to face the inside of first case accommodating portion 11A. Thus, first case outer frame portion 11 and first core piece 21 can be joined to each other with sufficient strength.

Figure 10:
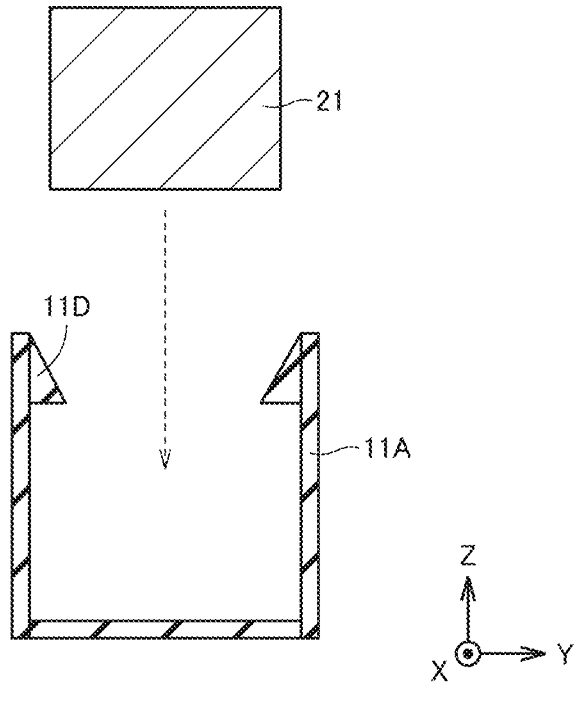
FIG. 10 is a schematic diagram showing the fourth example of the method of fixing the core piece inside the first case accommodating portion.

FIG. 10 is a schematic diagram showing the fourth example of the method of fixing the core piece inside the first case accommodating portion. Referring to FIG. 10, first, first core piece 21 is disposed inside a region separated by partition 12 inside first case accommodating portion 11A. Then, a case end portion 11D is processed into a part of the inner wall surface of first case accommodating portion 11A, particularly, a partial region of the inner side surface thereof in the upper portion in the Z direction. Case end portion 11D is a member extending from the inner wall surface of first case accommodating portion 11A toward the inside of the region separated by partition 12 in first case accommodating portion 11A. Case end portion 11D is preferably provided so as to be attached after first core piece 21 is placed. However, case end portion 11D needs to be firmly fixed to first case accommodating portion 11A so as not to become detached from first case accommodating portion 11A. The region surrounded by case end portion 11D is smaller in size in a plan view than first core piece 21 or the like accommodated inside first case accommodating portion 11A.

In this state, the attached case end portion 11D becomes an obstacle when first core piece 21 is moving upward in the Z direction from the inside of first case accommodating portion 11A. Furthermore, when case end portion 11D is formed to have a lowermost portion in the Z direction at substantially the same position as the uppermost portion of first core piece 21 in the Z direction, case end portion 11D applies downward force to first core piece 21 from above in the Z direction so as to press first core piece 21. Due to this force, first core piece 21 is fixed to be remained inside first case accommodating portion 11A.

Even when first case cover portion 11B is not provided as shown in FIG. 9 or 10, the present invention is not limited to the configuration shown in FIG. 9 or 10. For example, first core piece 21 disposed inside first case accommodating portion 11A may be fixed by an adhesive tape from above in the Z direction.

Then, an assembling procedure for reactors 101 to 103 will be described. First, first core piece 21 is accommodated and fixed inside the region separated by partition 12 inside first case accommodating portion 11A, for example, as shown in any one of FIGS. 7 to 10. Then, second core piece 22 shown in FIGS. 2, 4, and 6 is brought into close contact with the end portion of first case outer frame portion 11 on the positive side in the Y direction, as shown in each of the figures. Second core piece 22 and first case outer frame portion 11 are fixed by fixing member 31. Fixing member 31 is preferably an adhesive tape, for example, but is not limited thereto, and for example, may be an adhesive agent.

The following is an explanation about the background art of the present embodiment, followed by an explanation about the functions and effects of the present embodiment.

The core included in the reactor needs to be made using a material causing fewer losses. In order to reduce losses, the magnetic path formed by a core is provided with gap portions where no material of the core as a magnetic path exists, i.e., core gaps, at certain intervals in the extending direction of the magnetic path. In order to precisely manage the dimension of each core gap in the direction along a closed magnetic path, a method having been conventionally used is to polish the cross section of the cut core and fix a pair of adjacent cores to each other by a spacer or an adhesive agent. Also conventionally, reactors have been produced by a method of fixing each core by complex mechanical components. However, this required longer working time to complete an assembly of a reactor. This leads to problems such as decreased productivity and increased cost.

Thus, in the present embodiment, a plurality of first core pieces 21 and a partition 12 to separate a pair of adjacent first core pieces 21 are disposed inside first case outer frame portion 11 as an outer frame of first case 10. Also on the outside of first case 10, second core piece 22 is disposed so as to form a closed magnetic path having a closed loop shape, together with first core piece 21 inside first case 10. Partition 12 is disposed inside first case outer frame portion 11 and the plurality of first core pieces 21 are disposed so as to be separated by the respective partitions 12, thereby allowing formation of a structure formed of the plurality of first core pieces 21 with respective core gaps interposed therebetween. Only by defining the outer dimensions of first case outer frame portion 11 and accommodating first core pieces 21 therein, the total sum value of the core gaps between the plurality of first core pieces 21 can be managed. This eliminates the need to precisely manage each core gap between first core pieces 21. Furthermore, first core pieces 21 do not need to be fixed by using complex mechanical components. Reactors 101 to 103 each can be readily produced only by using first case outer frame portion 11 having partition 12. In other words, the productivity of reactors 101 to 103 can be significantly improved.

In the present embodiment, it is preferable that a pair of first core pieces 21B (21C) adjacent to each other, for example, in the Y direction and separated by partition 12 face each other with a gap interposed therebetween. In other words, for example, it is preferable that partition 12 faces first core pieces 21B with a gap interposed therebetween, as indicated by dimensions GP2 and GP3 in FIG. 12. Also, a plurality of core gaps are provided as distances between the plurality of partitions 12 and their respective first core pieces 21B adjacent thereto in the Y direction. In this case, it is preferable that at least one of the plurality of core gaps has a space therebetween in the Y direction. Some of the plurality of core gaps do not have any space, and, for example, partition 12 and first core piece 21B adjacent thereto may be in contact with each other.

In other words, such a space does not necessarily have to exist between one partition 12 and first core piece 21B (21C) adjacent thereto in the Y direction. The following is an explanation about an example in which there are a plurality of regions each sandwiched between partition 12 and first core piece 21B adjacent thereto in the Y direction. In this case, the plurality of sandwiched regions may include: some regions each including a gap spaced in the Y direction; and some other regions each not including a gap such that partition 12 and first core piece 21B are in contact with each other. In this state, the total sum of the core gaps as distances between the plurality of first core pieces 21B and the like is automatically set by the outer dimensions of first case 10 including partition 12. Thus, without having to pay particular attention during introduction of each first core piece 21B into first case 10, the total sum of the core gaps can be readily set, and the characteristics such as inductances of reactors 101 to 103 can be determined. Thus, reactors 101 to 103 can be readily produced. In other words, the productivity of reactors 101 to 103 can be significantly improved.

Also according to the present embodiment, the electrical performance of reactors 101 to 103 that are improved in productivity as described above can be improved, which will be hereinafter described.

Generally, the inductance value as the main electrical performance of a reactor is set by the number of turns of a coil, the magnetic permeability according to the type of the core material, the length of a magnetic path, the cross-sectional area of the magnetic path, and the size of a core gap between a pair of adjacent core pieces. The number of turns of the coil does not change due to variations occurring in the manufacturing process. The magnetic permeability according to the core material is also set at the specification value defined by the material manufacturer. Thus, it is not necessary to consider that the permeability according to the coil material significantly changes depending on the manufacturing process. However, the length of the magnetic path, the cross-sectional area of the magnetic path, and the dimensions of the core gap change depending on the arrangement of the core pieces inside first case 10 that forms a reactor. Thus, it is necessary to consider the influence on the inductance value exerted by changes of these parameters.

Figure 11:
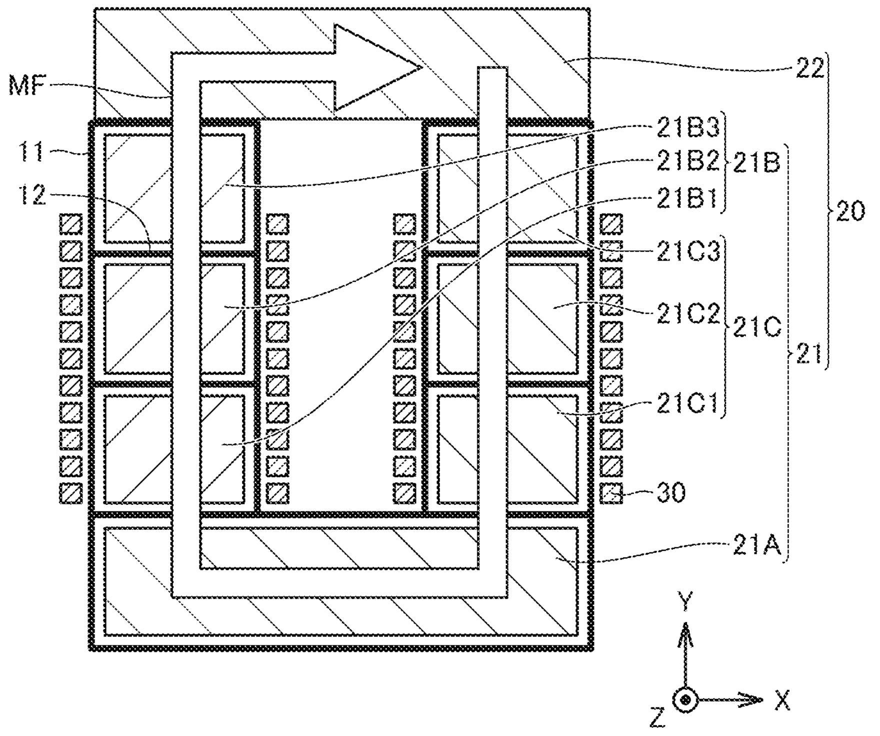
FIG. 11 is a schematic plan view showing a magnetic flux passing through a closed magnetic path formed by a plurality of core pieces in the first embodiment.

FIG. 11 is a schematic plan view showing a magnetic flux passing through a closed magnetic path formed by a plurality of core pieces according to the first embodiment. Referring to FIG. 11, for example, a magnetic flux MF passing through core piece 20 of reactor 101 circulates through a closed magnetic path formed of first core piece 21, i.e., first core pieces 21A, 21B, 21C and second core piece 22. First core piece 21B is formed of first core pieces 21B1, 21B2, and 21B3 that are arranged in this order from the negative side to the positive side in the Y direction. First core piece 21C is formed of first core pieces 21C1, 21C2, and 21C3 in this order from the negative side to the positive side in the Y direction. When first case outer frame portion 11 is formed of a resin material, the dimensional accuracy of first case outer frame portion 11 can be defined at 1% or less. Thus, even when core piece 20 moves inside first case outer frame portion 11 from the position where core piece 20 is to be originally located, the rate of change in each of length and cross-sectional area of the closed magnetic path is relatively small, and the inductance value is less influenced.

On the other hand, the size of the core gap may be as extremely small as 1 mm or less in each area. This increases the rate of amount of the change caused by movement of core piece 20 inside first case outer frame portion 11 from the position where core piece 20 is to be originally located. As a result, any dimensional change in the core gap may influence the inductance value.

Figure 12:
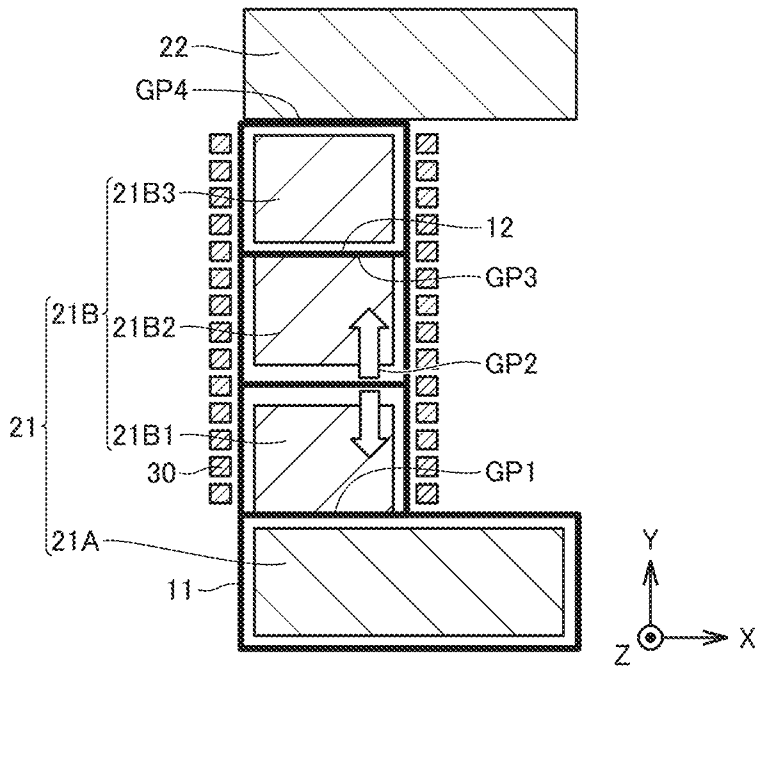
FIG. 12 is a schematic plan view showing the state where core gaps are non-uniform since some of the core pieces move from the state shown in FIG. 11.

However, in the present embodiment, even when core piece 20 moves in the direction of the dimension of the core gap, i.e., in the extending direction of the closed magnetic path, for example, as shown in FIG. 12, the inductance value does not change. FIG. 12 is a schematic plan view showing the state where core gaps are non-uniform since some of the core pieces move from the state shown in FIG. 11. The following is an explanation about an example with reference to FIG. 12 in which, inside first case outer frame portion 11, first core piece 21B1 moves from its original position toward the negative side in the Y direction while first core piece 21B2 moves from its original position toward the positive side in the Y direction. In this case, a dimension GP1 of the core gap between first core piece 21B1 and first core piece 21A is smaller than the originally intended value. Also, a dimension GP2 of the core gap between first core piece 21B1 and first core piece 21B2 is larger than the originally intended value. Also, a dimension GP3 of the core gap between first core piece 21B2 and first core piece 21B3 is smaller than the originally intended value. On the other hand, since first core piece 21B3 does not move, a dimension GP4 of the core gap between first core piece 21B3 and second core piece 22 adjacent thereto does not change.

In this case, dimension GP2 increases by an amount of decrease in dimensions GP1 and GP3, and the total sum of the core gaps between first core pieces 21 adjacent to each other does not change. The total sum of the core gaps between first core pieces 21 influences the inductance value. Thus, even when first core pieces 21B1 and 21B2 move as shown in FIG. 12, the inductance value of reactor 101 is not influenced thereby.

As described above, in FIG. 12, even when individual first core pieces 21B1, 21B2, and 21B3 move in the Y direction inside first case outer frame portion 11, no functional problem occurs in reactor 101. In other words, in the present embodiment, among the plurality of first core pieces 21B, 21C disposed with respective partitions 12 interposed therebetween, the distance between one pair of adjacent first core pieces may be different from the distance between another pair of adjacent first core pieces. The above-mentioned distance between one pair of adjacent first core pieces is a distance between first core piece 21B1 and first core piece 21B2, for example. The above-mentioned distance between another pair of adjacent first core pieces is a distance between first core pieces 21B2 and 21B3, for example. In other words, dimension GP2 may be different from dimension GP3 in FIG. 12. In this case, the expression such as different in dimension means that the dimension values are different from each other by 10% or more. When first core pieces 21B and 21C are disposed to be inclined with respect to partition 12 and to be changed in dimension value, the dimension value means an average value (median value) of the dimensions. The reactor is assumed to include a plurality of regions each sandwiched between a pair of first core pieces 21 adjacent to each other in the Y direction among the plurality of first core pieces 21. In this case, these sandwiched regions all may be different in dimension in the Y direction. However, at least one of these sandwiched regions may be different in dimension in the Y direction from other sandwiched regions. In other words, for example, only one of the sandwiched regions may be different in dimension in the Y direction from other sandwiched regions, and these other sandwiched regions may be substantially equal in dimension in the Y direction. Also, for example, only two of the sandwiched regions may be different in dimension in the Y direction from other sandwiched regions, and these other sandwiched regions may be substantially equal in dimension in the Y direction.

However, for example, when first core pieces 21B1 to 21B3 move so as to be displaced in the X direction in FIG. 12 to thereby change the area of the portion where a pair of first core pieces 21 adjacent to each other in the Y direction face each other, the inductance value of reactor 101 is influenced thereby. Thus, for example, when the inductance value needs to be managed to fall within a range of the error equal to or less than ±10%, the changes in core gaps GP1 to GP4 needs to fall within about 10% or less as a guideline value. However, when first case outer frame portion 11 is made of resin as described above, the dimensional accuracy of the outermost shape of first case outer frame portion 11 can be defined at 1% or less. Thus, the changes in core gaps GP1 to GP4 are also ±1% or less, and the amount of change can be set at 10% or less. Thus, as long as first core piece 21 is disposed inside first case outer frame portion 11, the above-mentioned changes can be controlled basically so as not to influence the inductance value even in consideration of the positional displacement of the core piece in the width direction intersecting the extending direction of the closed magnetic path.

When the change in inductance value needs to be further reduced, it is preferable to increase the accuracy of the outer dimensions of first case outer frame portion 11 and the accuracy of the dimension between partitions 12 to thereby reduce the space in which first core piece 21 can move. Thereby, higher accuracy can be achieved.

As described above, according to the present embodiment, the electrical performance of reactors 101 to 103 that are improved in productivity can be improved.

In addition, the following functions and effects are achieved according to the present embodiment. In general, a dust core and a ferrite core are formed by heat treatment of a powdery material that has been molded by a pressing machine. At this time, the pressure applied to the surface pressed by the pressing machine needs to be constant. Thus, formation of a larger core requires a press machine having higher pressing performance. In addition, the molded material shrinks during heat treatment. Accordingly, formation of a larger core leads to lower dimensional accuracy. An amorphous core and a nano-crystalline core each are formed by heat treatment of a stack of thin strip-shaped materials. The amorphous core and the nano-crystalline core also shrink during heat treatment like a dust core and a ferrite core. Thus, formation of a larger core leads to lower dimensional accuracy.

According to the present embodiment, first core pieces 21A to 21C and second core piece 22 as a plurality of core pieces 20 constitute the entire core. Thus, the dimensions of the formed core piece are smaller than those of a large-sized core formed using an integral-type die. Thus, the entire reactor can be readily manufactured, and dimensional variations during manufacturing can be reduced. Also, the materials of a large-sized core can be produced by only limited manufacturers. In this regard, according to the present embodiment, a plurality of small-sized core pieces are formed, thereby allowing further stable procurement of the components.

In conventional and commonly-used reactors, a spacer made of a nonmagnetic material such as resin or insulating paper is disposed between two core pieces. The spacer manages the dimensions of each core gap. In the present embodiment, instead of managing the core gap between the core pieces, the total sum of the core gaps in the entire core piece 20 is managed by first case 10 in which partitions 12 are disposed between the core pieces. This eliminates the need to disposes a spacer between the core pieces.

A core gap does not need to be provided only at one position in a closed magnetic path formed of a plurality of core pieces. A plurality of core gaps may be provided in the closed magnetic path formed of core pieces 20 such that the dimensions of each core gap have design values. The core gaps are different in numerical value range of the required dimensions depending on the material used for core piece 20. For example, in the case of a ferrite core, the relative permeability is about 1500 or more and 4000 or less. Thus, core piece 20 is preferably disposed such that the total value of the dimensions of the plurality of core gaps in the closed magnetic path is in a range of 1 mm or more and 20 mm or less and such that desired electrical characteristics are achieved.

As a larger number of core pieces are included in the closed magnetic path and a larger number of core gaps are formed, the dimensions of each core gap become smaller. This consequently leads to a smaller magnetic flux that leaks from each core gap. Furthermore, the eddy current loss in the coil caused by interlinkage with a coil disposed adjacent to a core gap can be reduced. Accordingly, the loss in the entire reactor 101 can be reduced.

In the case where core gaps are managed by a spacer or an adhesive agent as in conventional cases, a larger number of core pieces increases the number of operations for joining the core pieces, thereby decreasing the productivity. However, in the present embodiment, all of core pieces 20 are disposed inside first case accommodating portion 11A and collectively held therein. Thus, even when the number of first core pieces 21 and the like forming core piece 20 increases, the productivity does not decrease.

Furthermore, when a core piece made of ferrite or the like is generally used, a large-sized underlying core is cut, and the cut cross section is polished to prepare a core piece. However, according to the present embodiment, core piece 20 is disposed inside first case accommodating portion 11A. The dimensions of the core gap are managed by partition 12 inside first case accommodating portion 11A. Thus, the flatness of the cut cross section of the core does not need to be increased. This eliminates the need to polish the cut surface for formation of core piece 20. A ferrite core itself is an inexpensive material, but is expensive when it is used as a material for a general core piece. This is because operation cost is required for performing a cutting step, a subsequent polishing step and the like. However, the present embodiment can eliminate the need to polish the cross section of core piece 20 that has been cut. Thus, the processing time for the core piece can be shortened, and thereby, core piece 20 can be prepared at a lower cost.

Second Embodiment

Figure 13:
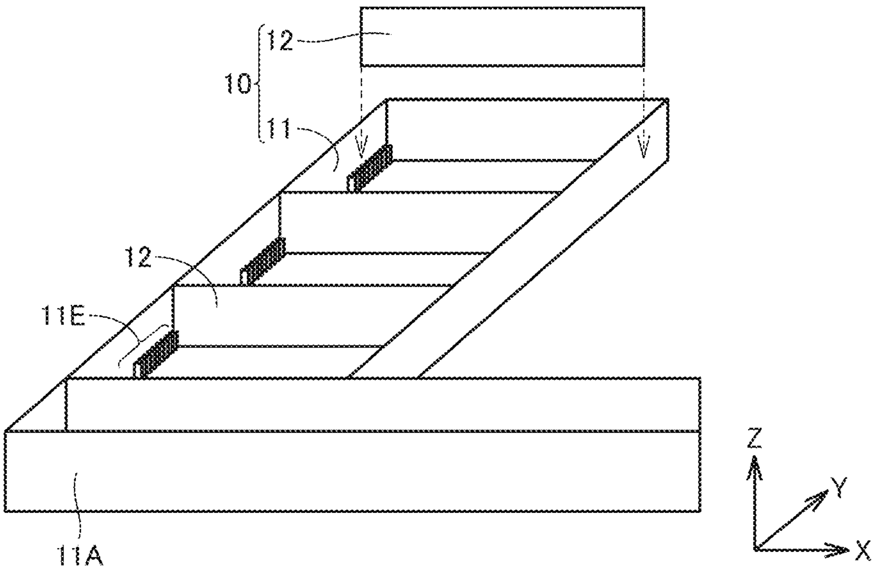
FIG. 13 is a schematic enlarged perspective view showing a characteristic portion of a first case of a reactor according to the second embodiment.

FIG. 13 is a schematic enlarged perspective view showing a characteristic portion of a first case of a reactor according to the second embodiment. Referring to FIG. 13, the reactor in the second embodiment has basically the same configuration as those of reactors 101 to 103 in the first embodiment. Thus, the same components as those in the first embodiment will be denoted by the same reference characters, and the description thereof will not be repeated. However, as shown in FIG. 13, in the present embodiment, a plurality of ribs 11E are formed inside first case outer frame portion 11.

Specifically, ribs 11E are a plurality of thin and small-sized members that are attached on the inner wall surface of first case outer frame portion 11, particularly on the inner side surface, at a distance from each other in the Y direction, for example. A thin plate-like partition 12 is inserted into a groove-shaped space portion sandwiched between a pair of ribs 11E adjacent to each other in the Y direction, for example, among the plurality of ribs 11E. Thereby, partition 12 is attached so as to extend in the Z direction inside first case outer frame portion 11. In other words, partition 12 can be disposed in an upright state by ribs 11E. Since a plurality of groove-shaped space portions are provided, partition 12 can be disposed at any position inside first case outer frame portion 11 within the range in which ribs 11E are formed. This is because partition 12 can be arbitrarily detachable inside a region of a plurality of groove-shaped space portions sandwiched between ribs 11E.

Rib 11E may be formed on one side in the X direction, for example, in each of two portions extending in the Y direction in first case outer frame portion 11 having a U-shaped plane shape, and for example, may be formed only on the inner side surface on the left side in FIG. 13 or only on the inner side surface on the right side in FIG. 13. Ribs 11E may be formed on both the right side and the left side in the X direction in each of the two portions extending in the Y direction.

By the above-described rib 11E, the position at which partition 12 is disposed can be changed inside first case outer frame portion 11. In other words, the versatility of the state inside first case outer frame portion 11 can be enhanced. Thus, even when the size of first core piece 21 is changed, the degree of freedom for accommodating first core piece 21 inside first case outer frame portion 11 is increased by changing the position where partition 12 is placed.

Third Embodiment

Figure 14:
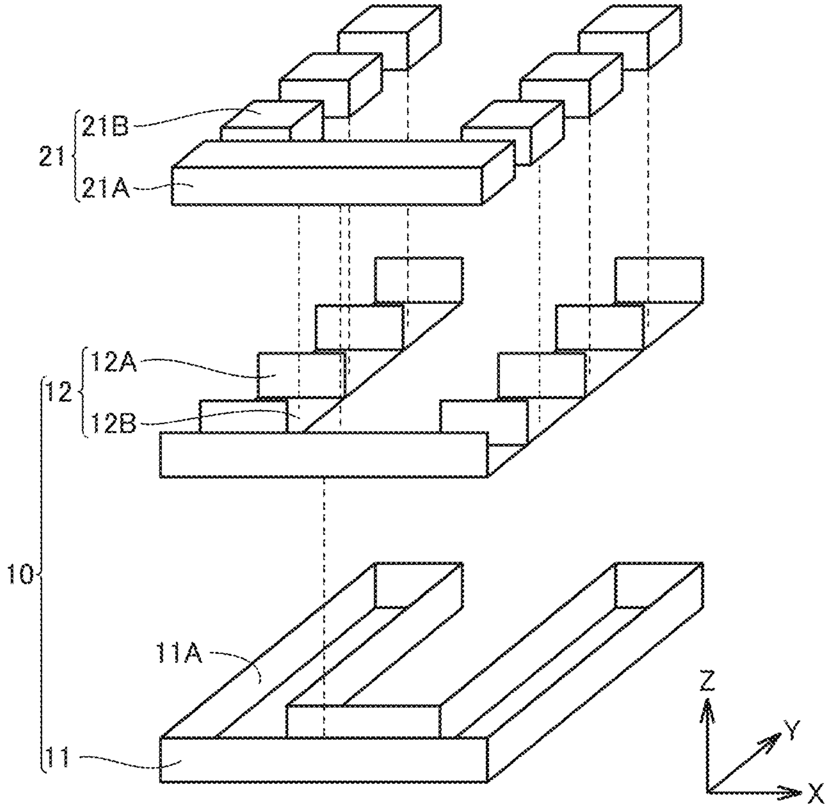
FIG. 14 is a schematic enlarged perspective view showing a characteristic portion of a first case of a reactor according to the third embodiment.

FIG. 14 is a schematic enlarged perspective view showing a characteristic portion of a first case of a reactor according to the third embodiment. Referring to FIG. 14, the reactor according to the third embodiment has basically the same configuration as those of reactors 101 to 103 in the first embodiment. Thus, the same components as those in the first embodiment will be denoted by the same reference characters, and the description thereof will not be repeated. In the present embodiment, first case 10 includes first case outer frame portion 11 and partition 12 as in other embodiments. First case outer frame portion 11 is capable of accommodating a plurality of first core pieces 21. Partition 12 is disposed inside first case outer frame portion 11. As a configuration of partition 12, a plurality of first case partition portions 12A as partition 12 are disposed at a distance from each other and attached to a partition base portion 12B. In other words, partition 12 includes a plurality of first case partition portions 12A and partition base portion 12B. In partition 12, a plurality of first case partition portions 12A are disposed at a distance from each other. In partition 12, a plurality of first case partition portions 12A spaced apart from each other are attached to partition base portion 12B and integrated with partition base portion 12B. Partition 12 including partition base portion 12B and the plurality of first case partition portions 12A integrally attached to partition base portion 12B is attachable to and detachable from first case outer frame portion 11.

By the configuration as described above, also in the present embodiment, partition 12 can be detachable from first case outer frame portion 11 as in the second embodiment. Thus, for example, when first core piece 21 is a small-sized piece, partition 12 is placed in first case outer frame portion 11, and thereafter, first core piece 21 is accommodated in first case outer frame portion 11. Also, when first core piece 21 is a large-sized piece, first core piece 21 can be accommodated directly in first case outer frame portion 11 in the state where no partition 12 is placed in first case outer frame portion 11.

Fourth Embodiment

Figure 15:
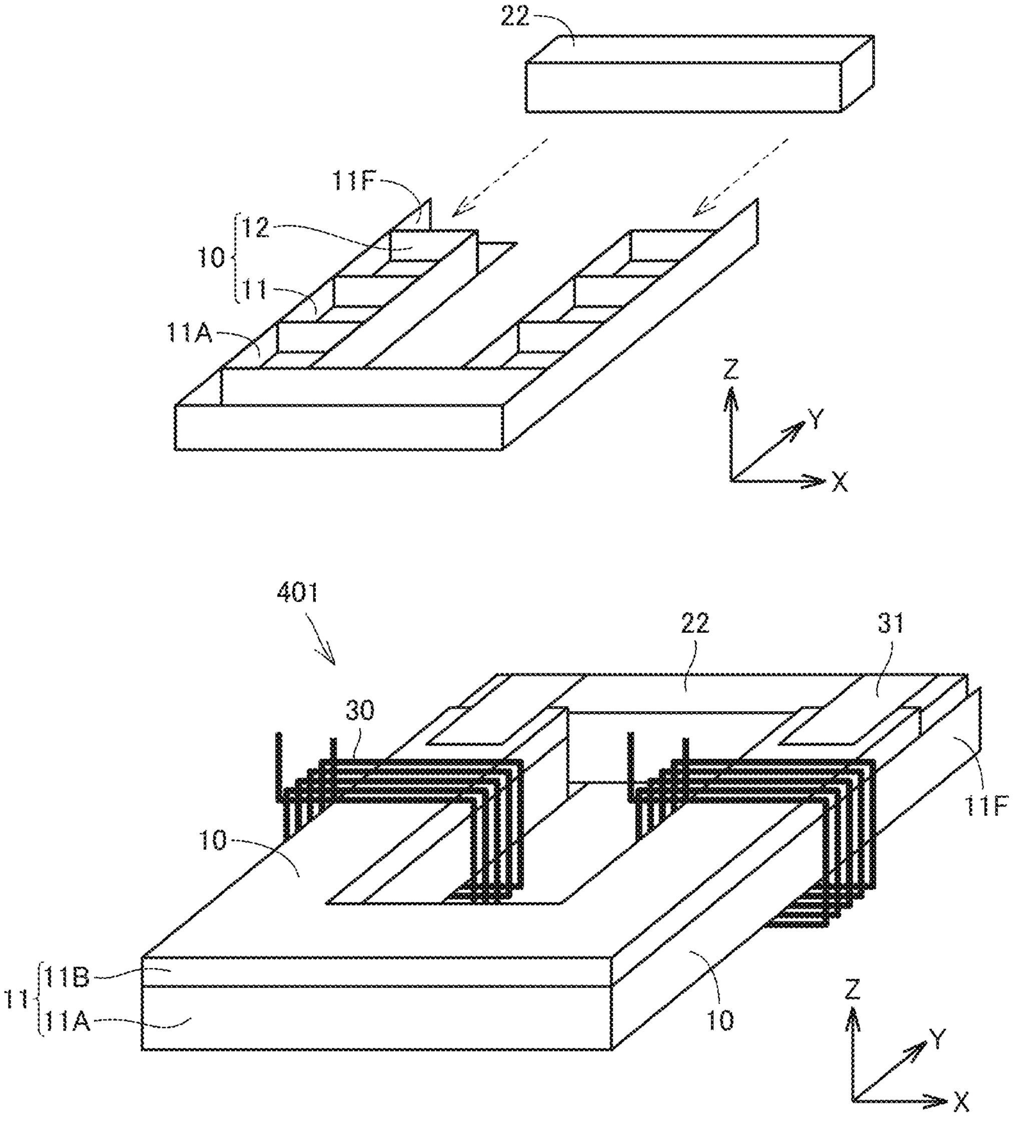
FIG. 15 is a schematic perspective view showing a characteristic portion of a first case of a reactor according to the fourth embodiment and a completed product thereof.

FIG. 15 is a schematic perspective view showing a characteristic portion of a first case of a reactor according to the fourth embodiment and a completed product thereof. Referring to FIG. 15, the present embodiment is different from the first embodiment in the configuration of an end portion 11F on the positive side in the Y direction in each of two portions extending in the Y direction, i.e., on the side opposite to the portion extending in the X direction, in first case outer frame portion 11 as first case 10 having a U-shape in a plan view.

Specifically, in the present embodiment, in the above-mentioned end portion 11F, i.e., in a region on the further positive side in the Y direction with respect to a pair of partitions 12 (first case partition portion 12A) on the most positive side in the Y direction, the inner side surfaces of the two portions that face each other are not provided. Also, the end face of first case outer frame portion 11 on the most positive side in the Y direction in each of these two portions is not provided. Thereby, in first case outer frame portion 11, the pair of end portions 11F accommodate corresponding parts of second core piece 22, i.e., one end portion and the other end portion of second core piece 22 in the X direction. In other words, in the present embodiment, first case 10 has a shape capable of accommodating at least a part of second core piece 22.

The reactor in the fourth embodiment has basically the same configuration as those of the reactors in the first to third embodiments except for the configuration described above. In the following, the same main points as those in the first to third embodiments will be described again. A reactor 401 in the fourth embodiment mainly includes a first case 10, a core piece 20, and a coil 30. First case 10 is shaped as a part of a closed loop formed by core piece 20 of reactor 101 or shaped as a part of a closed magnetic path having a closed loop shape. Core piece 20 includes a plurality of first core pieces 21 and a second core piece 22. The plurality of first core pieces 21 are disposed inside first case 10. Second core piece 22 is introduced, for example, from the positive side in the Y direction as indicated by dotted arrows in the figure and thereby placed in end portion 11F of first case 10 on the positive side in the Y direction. This is based on the structure of first case outer frame portion 11 that lacks an end face on the most positive side in the Y direction in end portion 11F, through which second core piece 22 can be introduced and removed.

Two end portions 11F are formed on the positive side in the Y direction in the respective two portions extending in the Y direction in first case outer frame portion 11. One end portion of second core piece 22 is accommodated in one of these two end portions 11F. The other end portion of second core piece 22 is accommodated in the other one of these two end portions 11F. Second core piece 22 is disposed to extend in the X direction, and one end portion and the other end portion of second core piece 22 are accommodated in each of one pair of end portions 11F in first case outer frame portion 11. Thus, second core piece 22 is disposed so as to form a closed magnetic path having a substantially rectangular closed loop shape, together with the plurality of first core pieces 21A, 21B, and 21C accommodated in first case 10, i.e., in first case outer frame portion 11. The above-mentioned substantially rectangular closed loop shape means that it seems as a substantially rectangular closed loop in a plan view, for example, by ignoring: a gap between a pair of first core pieces 21B adjacent to each other in the Y direction among the plurality of first core pieces; and a positional displacement between the pair of first core pieces 21B in the X direction.

Coil 30 is wound, for example, around a part of core piece 20 shown in FIG. 1 as a closed magnetic path. More specifically, coil 30 is wound around a portion of first case outer frame portion 11 in which first core pieces 21B disposed therein extend in the Y direction.

Also, a plurality of first core pieces 21 and a partition 12 to separate a pair of adjacent first core pieces 21 among the plurality of first core pieces 21 are disposed inside first case outer frame portion 11 as an outer frame of first case 10. More specifically, first core piece 21A included in first core piece 21 is accommodated in a portion inside first case accommodating portion 11A, in which first case outer frame portion 11 as first case 10 extends in the X direction. The plurality of first core pieces 21B, 21C are accommodated in their respective portions inside first case accommodating portion 11A, where first case outer frame portion 11 as first case 10 extends in the Y direction. Inside first case outer frame portion 11, i.e., inside first case accommodating portion 11A, partition 12 serves to separate a pair of adjacent first core pieces 21A, 21B, 21C among the plurality of first core pieces 21A, 21B, 21C.

First case outer frame portion 11 includes: first case accommodating portion 11A formed as a portion of first case outer frame portion 11 and capable of accommodating a plurality of first core pieces 21A, 21B, and 21C; and first case cover portion 11B to cover a space inside first case accommodating portion 11A. In FIG. 15, first case cover portion 11B is disposed so as to cover only a portion other than end portion 11F in first case accommodating portion 11A. In other words, in FIG. 15, first case cover portion 11B is disposed so as not to cover second core piece 22 disposed on the most positive side in the Y direction in first case accommodating portion 11A including end portion 11F. However, in the present embodiment, first case cover portion 11B may have a rectangular planar shape, for example, so as to also cover end portion 11F and second core piece 22 disposed in a region including end portion 11F.

Also in reactor 401 in the present embodiment, it is preferable that first case accommodating portion 11A and first case cover portion 11B are fitted by a fitting mechanism referred to as a so-called snap-fit structure 13, as shown in a region surrounded by a dotted line in FIG. 5.

In reactor 401 in the present embodiment, it is preferable that a pair of adjacent first core pieces 21B separated by partition 12 face each other with a gap interposed therebetween, for example, as indicated by dimensions GP2 and GP3 in FIG. 12. There are a plurality of core gaps formed as distances between the plurality of partitions 12 and their respective first core pieces 21B adjacent thereto in the Y direction. In this case, it is preferable that at least one of the plurality of core gaps has a space provided therebetween in the Y direction.

In reactor 401 in the present embodiment, for example, in FIG. 12, among the plurality of first core pieces 21B, 21C disposed with the respective partitions 12 interposed therebetween, a distance between one pair of adjacent first core pieces may be different from a distance between another pair of adjacent first core pieces. The above-mentioned distance between one pair of adjacent first core pieces is a distance between first core piece 21B1 and first core piece 21B2, for example. The above-mentioned distance between another pair of adjacent first core pieces is a distance between first core piece 21B2 and first core piece 21B3, for example.

Also in the present embodiment, for example, as shown in FIG. 13, a plurality of ribs 11E are formed inside first case outer frame portion 11. Ribs 11E are a plurality of thin and small-sized members that are attached on the inner wall surface of first case outer frame portion 11, particularly on the inner side surface, at a distance from each other in the Y direction, for example. A thin plate-like partition 12 is inserted into a groove-shaped space portion sandwiched between a pair of ribs 11E adjacent to each other in the Y direction, for example, among the plurality of ribs 11E. Partition 12 can be disposed arbitrarily detachably inside a region of a plurality of groove-shaped space portions sandwiched between ribs 11E.

Also in the present embodiment, first case 10 includes first case outer frame portion 11 and partition 12 as in other embodiments. First case outer frame portion 11 is capable of accommodating a plurality of first core pieces 21. Partition 12 is disposed inside first case outer frame portion 11. In partition 12, for example, as shown in FIG. 14, a plurality of first case partition portions 12A disposed at a distance from each other are attached to partition base portion 12B and integrated with partition base portion 12B. Partition 12 including partition base portion 12B and the plurality of first case partition portions 12A integrally attached to partition base portion 12B is attachable to and detachable from first case outer frame portion 11.

Also in the present embodiment, at least one of buffer member 43 and adhesive agent 44 is disposed inside first case outer frame portion 11, for example, as shown in FIG. 9. First case outer frame portion 11 and the plurality of first core pieces 21 are joined by at least one of buffer member 43 and adhesive agent 44. Thus, both buffer member 43 and adhesive agent 44 may be disposed inside first case outer frame portion 11. First case outer frame portion 11 and the plurality of first core pieces 21 may be joined by both buffer member 43 and adhesive agent 44.

Then, the functions and effects of the present embodiment will be described. As described above, reactor 401 in the present embodiment includes first case 10, the plurality of first core pieces 21, second core piece 22, and coil 30. First case 10 is shaped as a part of a closed loop. The plurality of first core pieces 21 are disposed inside first case 10. Second core piece 22 is disposed so as to form a closed magnetic path having a closed loop shape, together with the plurality of first core pieces 21 inside first case 10. Coil 30 is wound around the closed magnetic path. A plurality of first core pieces 21B (21C) and a partition 12 to separate a pair of adjacent first core pieces 21B (21C) among the plurality of first core pieces 21B (21C) are disposed inside first case outer frame portion 11 as an outer frame of first case 10. First case 10 has a shape capable of accommodating at least a part of second core piece 22. First case outer frame portion 11 includes: first case accommodating portion 11A as a portion of first case outer frame portion 11 that is capable of accommodating the plurality of first core pieces 21; and first case cover portion 11B to cover a space inside first case accommodating portion 11A.

Also in the present embodiment, the outer dimensions of first case outer frame portion 11 are defined, in which first core piece 21 and second core piece 22 are accommodated. Only thereby, the total sum value of the core gaps between the plurality of first core pieces 21 and between first core piece 21 and second core piece 22 can be managed. This eliminates the need to precisely manage each core gap between first core pieces 21 and the like. Furthermore, first core pieces 21 and the like do not need to be fixed by using complex mechanical components. Reactor 401 can be readily produced only by using first case outer frame portion 11 having partition 12. In other words, the productivity of reactor 401 can be significantly improved.

As described above, in the present embodiment, first case 10 has a shape capable of accommodating at least a part of second core piece 22. Due to such a configuration, in the present embodiment, second core piece 22 is accommodated in one pair of end portions 11F of first case outer frame portion 11 from the positive side in the Y direction as shown by arrows in FIG. 15. Thus, second core piece 22 can be further simply fixed to first case outer frame portion 11. Particularly in the X direction, the end portion of second core piece 22 in its extending direction receives interference from end portion 11F of first case outer frame portion 11, thereby allowing second core piece 22 to be more reliably fixed in the X direction. Thus, the strength of fixing second core piece 22 to first case outer frame portion 11 can be improved.

Other functions and effects are the same as those in the first embodiment, but the main points will be hereinafter described again. In reactor 401 in the present embodiment, it is preferable that a pair of adjacent first core pieces 21B (21C) separated by partition 12 face each other with a gap interposed therebetween. In this state, the total sum of the core gaps as distances between the plurality of first core pieces 21B and the like is automatically set by the outer dimensions of first case 10 including partition 12. Thus, without having to pay particular attention during introduction of each first core piece 21B into first case 10, the total sum of the core gaps can be readily set, and the characteristics such as inductances of reactor 401 can be determined. Thus, reactor 401 can be readily produced.

In reactor 401 in the present embodiment, a plurality of ribs 11E are formed at a distance from each other inside first case outer frame portion 11. Partition 12 is detachably disposed between a pair of adjacent ribs 11E among the plurality of ribs 11E. Such a configuration may also be adopted. In this state, the position at which partition 12 is disposed can be changed by ribs 11E inside first case outer frame portion 11. In other words, the versatility of the state inside first case outer frame portion 11 can be enhanced. Thus, even when the size of first core piece 21 is changed, the degree of freedom for accommodating first core piece 21 inside first case outer frame portion 11 is increased by changing the position where partition 12 is placed.

In reactor 401 in the present embodiment, first case 10 includes: first case outer frame portion 11 capable of accommodating a plurality of first core pieces 21; and partition 12 disposed inside first case outer frame portion 11 and attachable to and detachable from first case outer frame portion 11. Such a configuration may also be adopted. For example, as shown in FIG. 14, partition 12 includes a plurality of first case partition portions 12A integrated with each other at a distance from each other. Thereby, as in the second and third embodiments, partition 12 can be detachable from first case outer frame portion 11. Thus, for example, when first core piece 21 is a small-sized piece, partition 12 is placed in first case outer frame portion 11, and thereafter, first core piece 21 is accommodated in first case outer frame portion 11. Also, when first core piece 21 is a large-sized piece, first core piece 21 can be accommodated directly in first case outer frame portion 11 without placing partition 12 in first case outer frame portion 11.

Also in reactor 401 in the present embodiment, it is preferable that first case accommodating portion 11A and first case cover portion 11B are fitted, for example, by snap-fit structure 13 as a fitting mechanism. Thereby, the strength of fitting between first case accommodating portion 11A and first case cover portion 11B is higher in reactor 102 than in reactor 101. Also thereby, the vibration resistance of reactor 102 can be improved.

Also in reactor 401 in the present embodiment, at least one of buffer member 43 and adhesive agent 44 is disposed inside first case outer frame portion 11. First case outer frame portion 11 and the plurality of first core pieces 21 are joined by at least one of buffer member 43 and adhesive agent 44. Such a configuration may also be adopted. Thereby, first case outer frame portion 11 and first core pieces 21 can be joined with sufficient strength.

Also in reactor 401 in the present embodiment, among the plurality of first core pieces 21B or 21C disposed with the respective partitions 12 interposed therebetween, a dimension GP2 as a distance between one pair of adjacent first core pieces 21B or 21C may be different from a dimension GP3 as a distance between another pair of adjacent first core pieces 21B or 21C, for example, as shown in FIG. 12. This also causes no functional problem in reactor 401.

Fifth Embodiment

Figure 16:
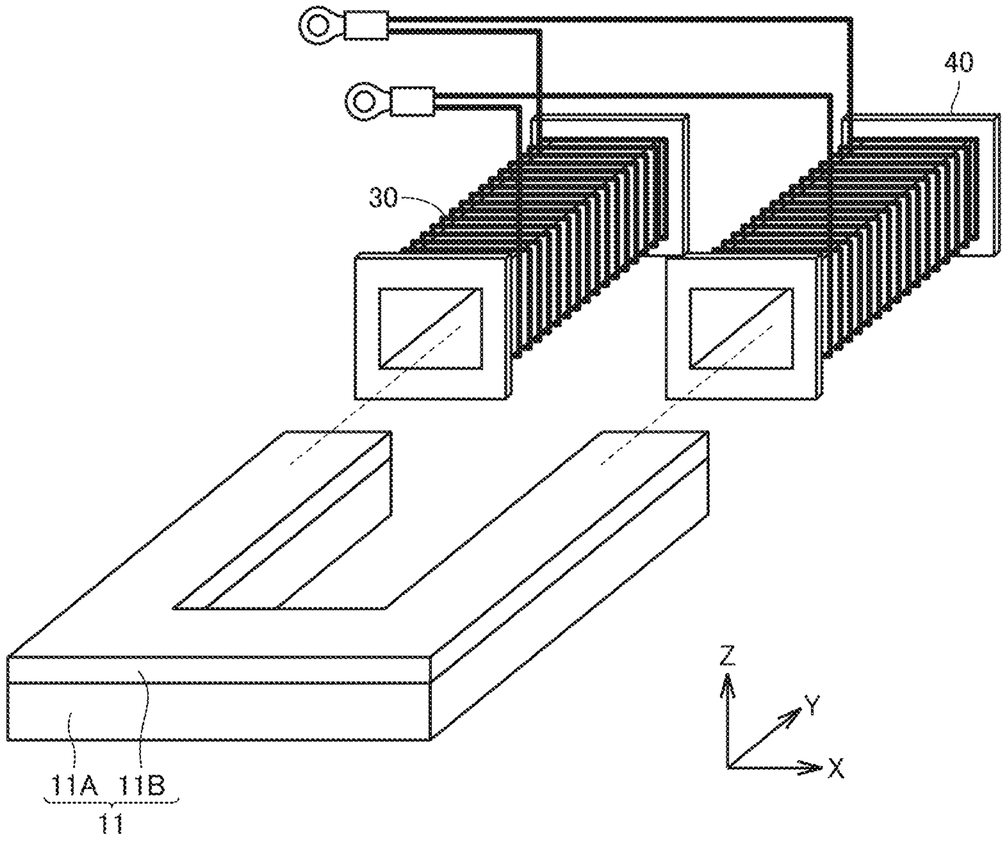
FIG. 16 is a schematic perspective view showing a manner in which members included in a reactor according to the fifth embodiment are arranged.

FIG. 16 is a schematic perspective view showing a manner in which members included in a reactor according to the fifth embodiment are arranged. FIG. 16 shows an external appearance of first case outer frame portion 11 in the state where first case cover portion 11B is closed. Referring to FIG. 16, the reactor in the fifth embodiment basically has the same configuration as those of reactors 101 to 103 in the first embodiment and reactor 401 in the fourth embodiment. Thus, the same components as those in the first and fourth embodiments will be denoted by the same reference characters, and the description thereof will not be repeated. However, the present embodiment is different from the first and fourth embodiments in that it further includes a bobbin portion 40.

Specifically, the reactor in the present embodiment further includes bobbin portion 40 disposed outside first case outer frame portion 11 as first case 10. Coil 30 is wound around the outside of bobbin portion 40.

In the present embodiment, bobbin portion 40 is disposed to cover, from outside, each of two portions extending in the Y direction in first case outer frame portion 11 having a U-shape in a plan view, so as to be fitted over each of these two portions. Thus, bobbin portion 40 extends in the Y direction. Coil 30 is wound around the outside of the portion extending in the Y direction in bobbin portion 40. Coil 30 wound in this manner is fixed to a portion extending in the Y direction in bobbin portion 40. Also, coil 30 wound around bobbin portion 40 is connected to a commonly known terminal.

Then, the functions and effects of the present embodiment will be described as compared with those of the first and fourth embodiments.

In the first and fourth embodiments, the wound coil 30 has a fixed cross-sectional shape such as a linear thick wire or a rectangular wire. Such coil 30 is fitted so as to surround the outside of first case outer frame portion 11. However, this method may decrease the productivity, for example, when coil 30 formed by winding a thin wire is used. Such a thin wire has an unstable shape even when it is spirally wound. In the first and fourth embodiments, the process is complicated since first case cover portion 11B is fitted to first case accommodating portion 11A and thereafter the wire is wound therearound. As a result, the productivity may decrease in the first embodiment.

However, the present embodiment provides a configuration in which coil 30 formed of such a thin wire or the like having an unstable shape is wound around the surface of bobbin portion 40 and fixed thereto, and then, fitted over first case 10 so as to be disposed outside first case 10. In other words, in the present embodiment, a wire is wound around the surface of bobbin portion 40 and fixed thereto in advance. Thus, even in the case of a thin wire or a wire having a large number of turns, the shape of this wire is fixed on the surface of bobbin portion 40 before it is fitted over first case 10. This eliminates the need to perform a complicated process for stabilizing the shape of the wire or the like. As described above, according to the present embodiment, the production efficiency particularly for a portion corresponding to coil 30 in the reactor can be improved.

Bobbin portion 40 is made of a nonmagnetic material. However, the material forming bobbin portion 40 is not limited to the same resin material as that of first case outer frame portion 11 and the like. Bobbin portion 40 may be made using a material that is higher in elasticity than first case 10 as required. In this case, the material that is higher in elasticity than first case 10 is a silicon material or the like. This allows bobbin portion 40 to be fitted over the outside of first case 10. Thereby, bobbin portion 40 can hold and press first case accommodating portion 11A and first case cover portion 11B for fixation. Also thereby, bobbin portion 40 allows improvement in vibration resistance of the entire reactor including first case accommodating portion 11A and first case cover portion 11B. Also thereby, bobbin portion 40 allows simplification of the fitting structure between first case accommodating portion 11A and first case cover portion 11B.

Furthermore, by using bobbin portion 40, the positional relation between coil 30 and first case 10 can be readily set. Also, the inductance value of coil 30 can be stabilized.

Sixth Embodiment

Figure 17:
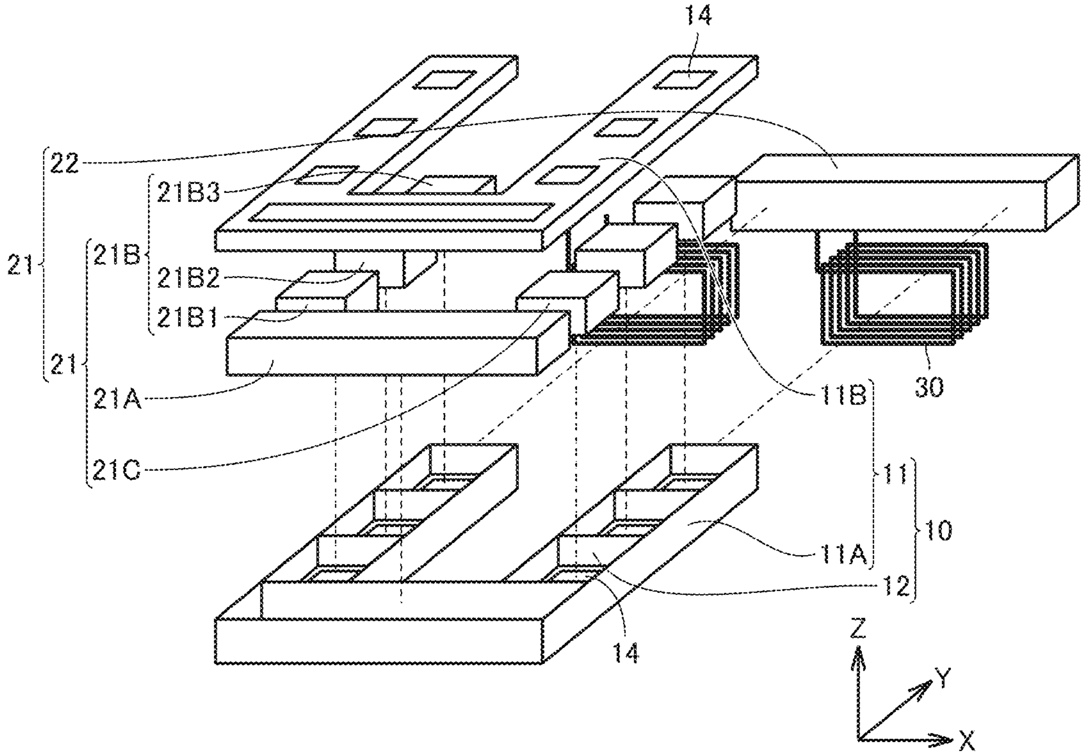
FIG. 17 is a schematic perspective view showing a manner in which members included in a reactor according to the sixth embodiment are arranged.
Figure 18:
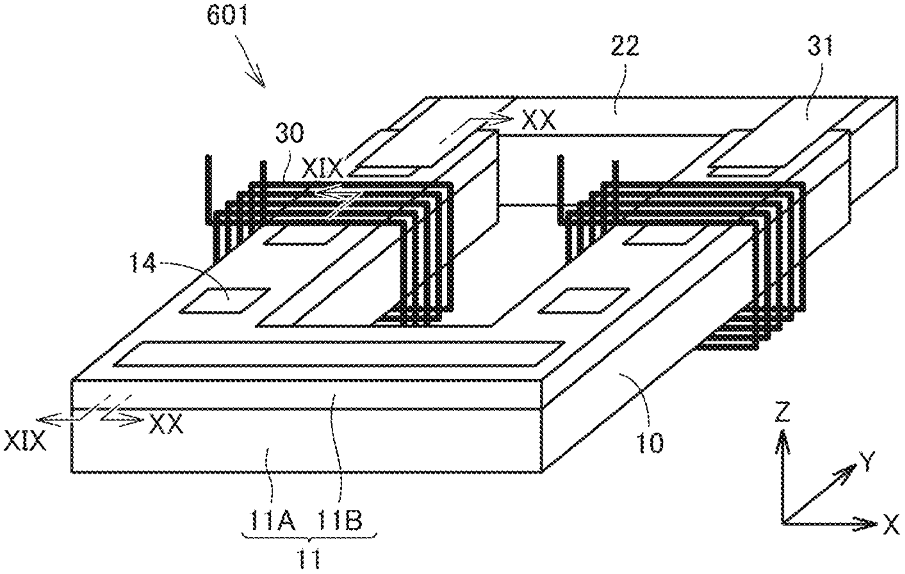
FIG. 18 is a schematic perspective view showing an external appearance of a completed reactor according to the sixth embodiment.

FIG. 17 is a schematic perspective view showing a manner in which members included in a reactor according to the sixth embodiment are arranged. FIG. 18 is a schematic perspective view showing an external appearance of a completed reactor according to the sixth embodiment. Referring to FIGS. 17 and 18, a reactor 601 according to the sixth embodiment has substantially the same configuration as those of reactor 101 according to the first embodiment and reactor 401 according to the fourth embodiment. Thus, in the following description, the same components as those of reactors 101 and 401 will be denoted by the same reference characters, and the description thereof will not be repeated. However, in the present embodiment, first case outer frame portion 11 is provided with an opening portion 14 penetrating therethrough. In this point, the present embodiment is different from the first and fourth embodiments.

Opening portion 14 is provided at the following position in first case accommodating portion 11A. Opening portion 14 is provided in the lowermost surface of first case accommodating portion 11A in the Z direction, specifically, in a central portion in a plan view in each of the regions separated by the respective partitions 12. Opening portion 14 preferably has a rectangular shape. However, when each of the regions separated by the respective partitions 12 has a square shape, opening portion 14 may also have a square shape. Thus, opening portion 14 is provided in a central region other than each side and each edge adjacent thereto in each of the regions separated by the respective partitions 12.

Opening portion 14 is provided at the following position in first case cover portion 11B. Opening portion 14 is provided in first case cover portion 11B so as to overlap planarly with opening portion 14 in the bottom surface of first case accommodating portion 11A when first case cover portion 11B is fitted so as to cover a portion through which the inner wall surface of first case accommodating portion 11A is exposed to outside.

In FIG. 17, opening portion 14 is not provided in a region corresponding to the side surface of first case accommodating portion 11A. However, the present invention is not limited to such a configuration. Opening portion 14 may be provided as required in some of regions such as a central portion in a plan view, for example, in each of regions corresponding to a pair of side surfaces facing each other in each region separated by partition 12 of first case accommodating portion 11A.

As described above, in the present embodiment, first case outer frame portion 11 is provided with opening portions 14 in at least one pair of surfaces facing each other with the respective first core pieces 21B, 21C interposed therebetween.

Figure 19:
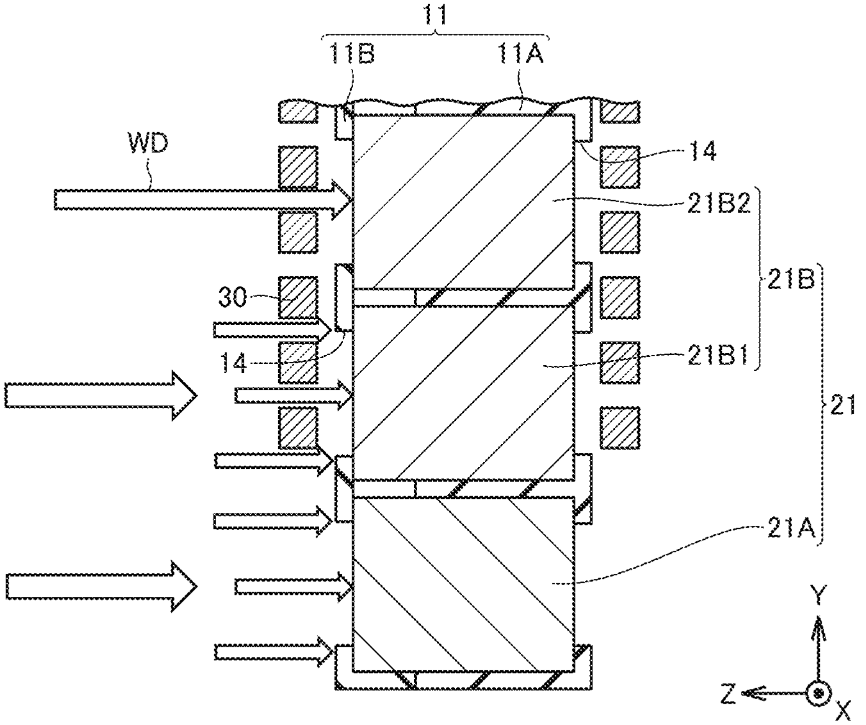
FIG. 19 is a schematic cross-sectional view of a portion taken along a line XIX-XIX in FIG. 18.

FIG. 19 is a schematic cross-sectional view of a portion taken along a line XIX-XIX in FIG. 18. Referring to FIG. 19, the following is an explanation about an example in which reactor 601 having opening portion 14 as described above is mounted at a position that is more likely to receive cooling air WD supplied by a cooling fan or the like. In this case, due to opening portion 14 provided as described above, cooling air WD directly hits the surface of first core piece 21 inside first case 10. Thus, first core piece 21 and the like can be efficiently cooled.

Figure 20:
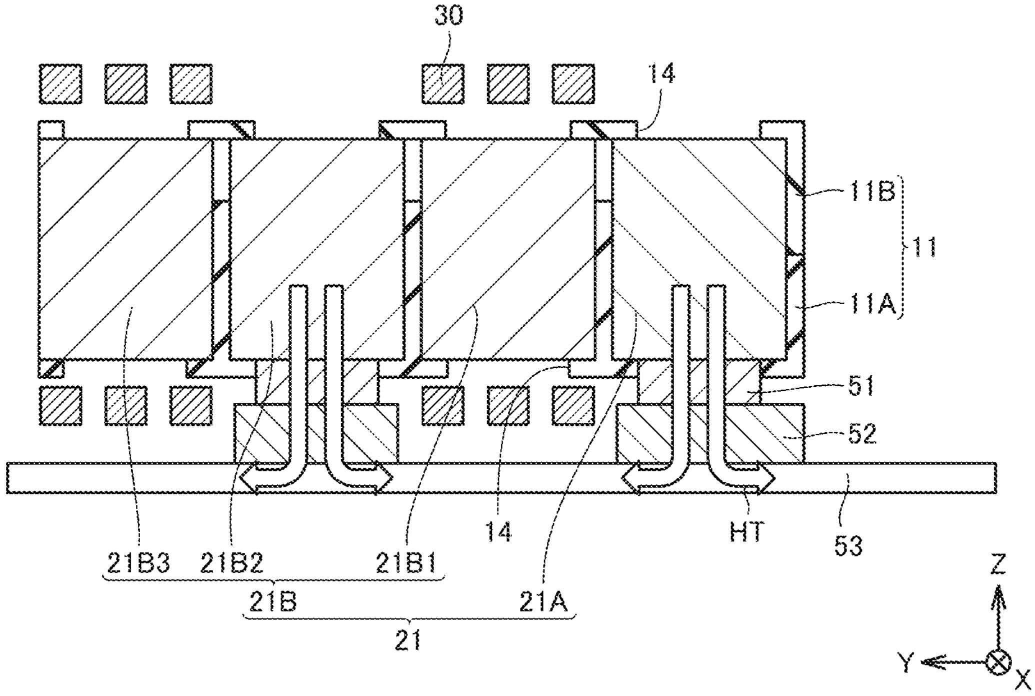
FIG. 20 is a schematic cross-sectional view of a portion taken along a line XX-XX in FIG. 18.

Even when cooling air WD (see FIG. 19) does not directly hit first core piece 21, the following effect is achieved. FIG. 20 is a schematic cross-sectional view of a portion taken along a line XX-XX in FIG. 18. FIG. 20 shows a configuration in which first core piece 21 is in contact with a housing 52 of a control board, a base surface of a heat radiator, or the like with a heat conducting sheet or a heat conducting resin as a heat conduction member 51 interposed therebetween. Housing 52 is attached to a commonly known substrate 53. Due to such a configuration, even when cooling air WD does not directly hit the surface of first core piece 21, the heat generated in first core piece 21 is dissipated as shown in a heat conduction path HT indicated by arrows in FIG. 20. Thus, first core piece 21 can be efficiently cooled.

In FIG. 20, coil 30 is not wound around first core pieces 21A and 21B2 of first core piece 21. Coil 30 is wound around first core pieces 21B1 and 21B3 of first core piece 21. The region of first core piece 21 around which coil 30 is not wound in this way is disposed in first core piece 21B2 in the central portion in the Y direction in first core piece 21B. Thereby, in the central portion in the Y direction where the temperature tends to rise, the temperature rise by coil 30 is suppressed and first core piece 21B2 can be cooled.

In addition, opening portion 14 is provided in first case outer frame portion 11, thereby achieving the following effect. When the electrical characteristics of reactor 601 are different from those in the normal situation, the state of the surface of first core piece 21 inside first case outer frame portion 11 can be checked through opening portion 14 without opening first case cover portion 11B of first case outer frame portion 11. In other words, it can be readily checked whether cracking and the like occurs or not in first core piece 21.

Seventh Embodiment

Figure 21:
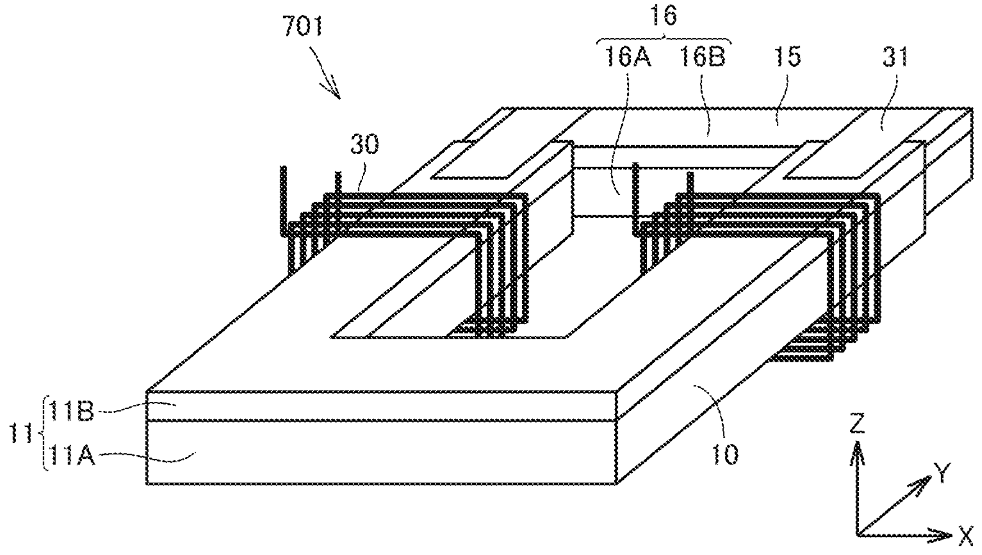
FIG. 21 is a schematic perspective view showing an external appearance of a completed reactor according to the seventh embodiment.

FIG. 21 is a schematic perspective view showing a manner in which members included in a reactor according to the seventh embodiment are arranged. Referring to FIG. 21, a reactor 701 according to the seventh embodiment has substantially the same configuration as those of reactor 101 according to the first embodiment and reactor 401 according to the fourth embodiment. Thus, in the following, the same components as those of reactors 101 and 401 will be denoted by the same reference characters, and the description thereof will not be repeated. However, the present embodiment is different in configuration from the first and fourth embodiments in that it includes a second case 15 in which second core piece 22 is accommodated.

Specifically, reactor 701 includes a second case 15 having a shape as another part of a closed loop. The shape as another part of a closed loop is, for example, a linear shape connecting ends of two portions extending in the Y direction to form a U-shape of first case 10. A second case outer frame portion 16 as second case 15 includes a second case accommodating portion 16A and a second case cover portion 16B. Second case accommodating portion 16A has a linear shape in a plan view, which is different from first case accommodating portion 11A having a U-shape in a plan view, but is basically the same as first case accommodating portion 11A in other points. Second case cover portion 16B has a linear shape in a plan view, which is different from first case cover portion 11B having a U-shape in a plan view, but is basically the same as first case cover portion 11B in other points.

Second core piece 22 in reactor 101 is disposed so as to form a closed magnetic path having a closed loop shape, together with the plurality of first core pieces 21. Similarly, in reactor 701, second core piece 22 is disposed inside second case 15. Thereby, second core piece 22 is disposed so as to form a closed magnetic path having a closed loop shape, together with the plurality of first core pieces 21.

As described above, in reactor 701 according to the present embodiment, first core piece 21 is accommodated in first case 10, and additionally, second core piece 22 is also accommodated in second case 15. Thus, scattering of core piece 20 including the material of second core piece 22 can be completely prevented. This is because second core piece 22 is not exposed. In the present embodiment, second core piece 22 is held inside second case 15 made of resin. This can suppress noise caused by magnetostriction of second core piece 22 that occurs when reactor 701 is energized.

Eighth Embodiment

Figure 22:
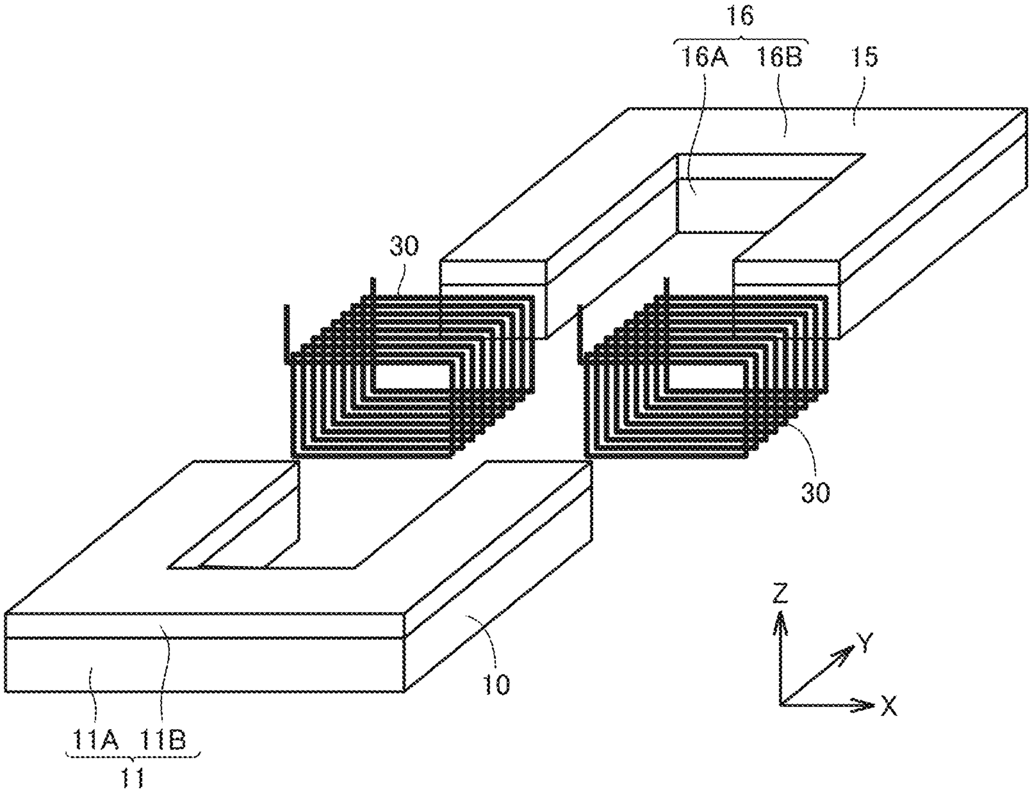
FIG. 22 is a schematic perspective view showing a manner in which members included in a reactor according to the eighth embodiment are arranged.
Figure 23:
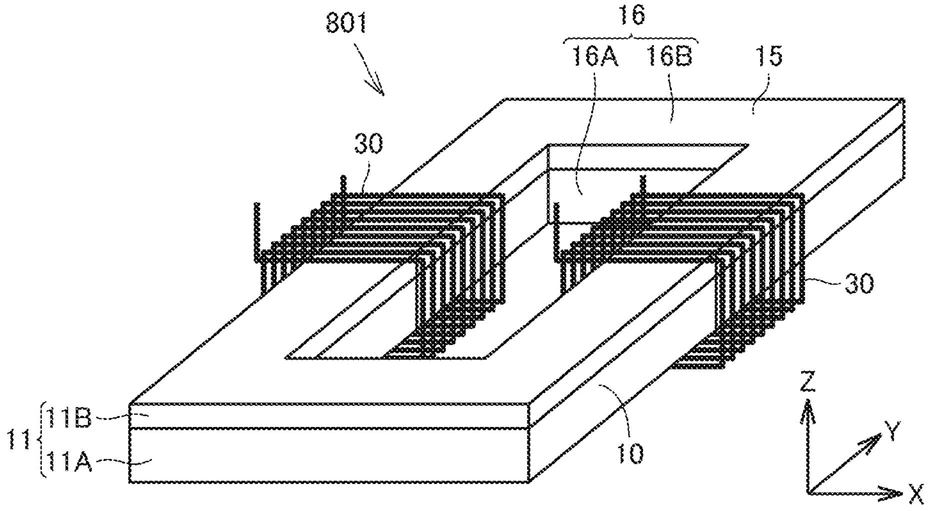
FIG. 23 is a schematic perspective view showing an external appearance of a completed reactor according to the eighth embodiment.

FIG. 22 is a schematic perspective view showing a manner in which members included in a reactor according to the eighth embodiment are arranged. FIG. 23 is a schematic perspective view showing an external appearance of a completed reactor according to the eighth embodiment. Referring to FIGS. 22 and 23, a reactor 801 according to the eighth embodiment has substantially the same configuration as that of reactor 701 according to the seventh embodiment. Thus, in the following, the same components as those of reactor 701 will be denoted by the same reference characters, and the description thereof will not be repeated. However, in the present embodiment, second case outer frame portion 16 as second case 15 has a U-shaped planar shape similar to that of first case outer frame portion 11 as first case 10. Accordingly, although not explicitly shown in the figures, core piece 20 inside second case outer frame portion 16 is identical in shape and configuration to core piece 20 inside first case outer frame portion 11.

Figure 24:
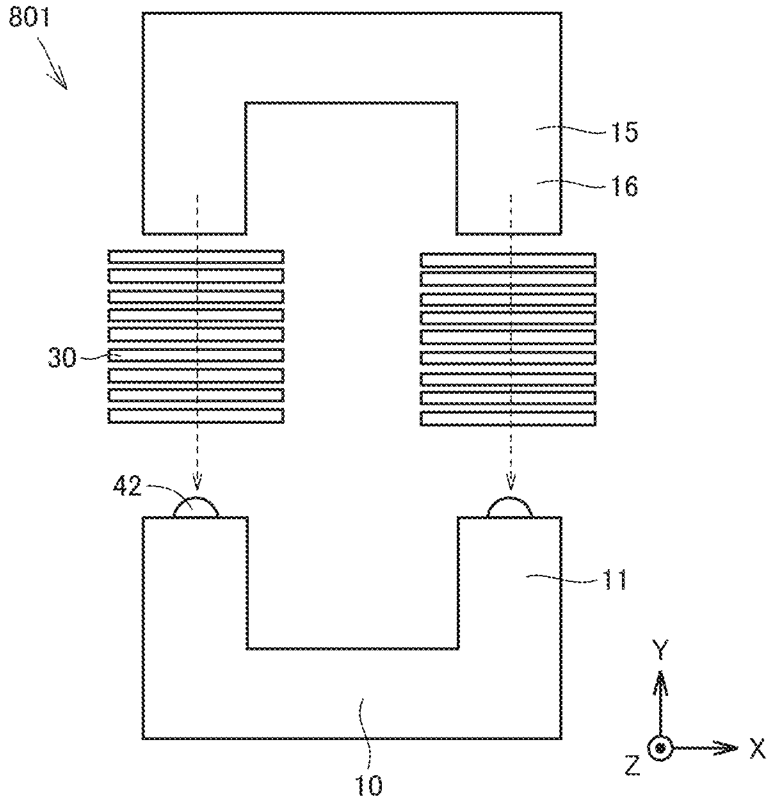
FIG. 24 is a schematic diagram showing the first example of a method of joining a first case and a second case of the reactor according to the eighth embodiment.
Figure 25:
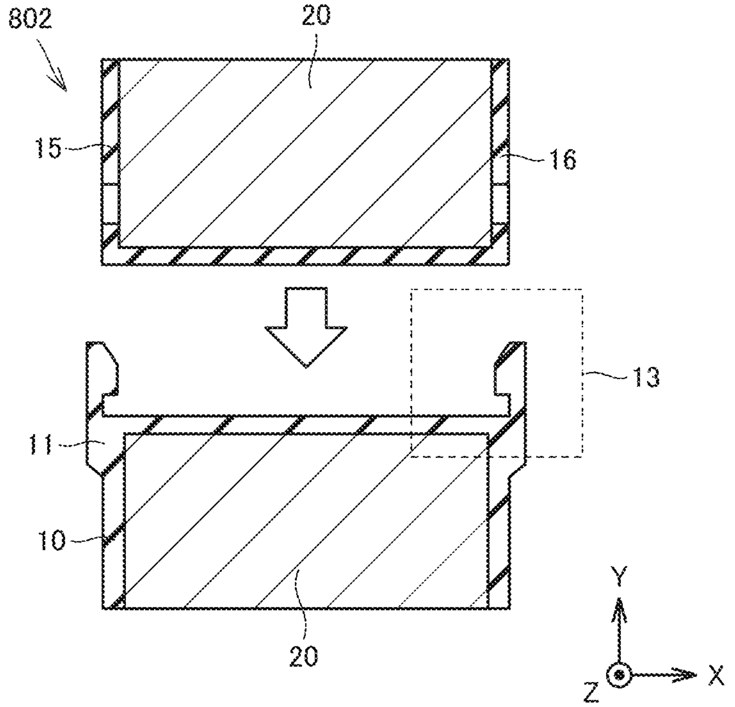
FIG. 25 is a schematic diagram showing the second example of the method of joining the first case and the second case of the reactor according to the eighth embodiment.

FIG. 24 is a schematic diagram showing the first example of a method of joining a first case and a second case of the reactor according to the eighth embodiment. FIG. 25 is a schematic diagram showing the second example of the method of joining the first case and the second case of the reactor according to the eighth embodiment. Referring to FIG. 24, first case 10 and second case 15 may be fixed by an adhesive agent 44. Alternatively, referring to FIG. 25, first case 10 and second case 15 may be fixed by snap-fit structure 13.

Ninth Embodiment

Figure 26:
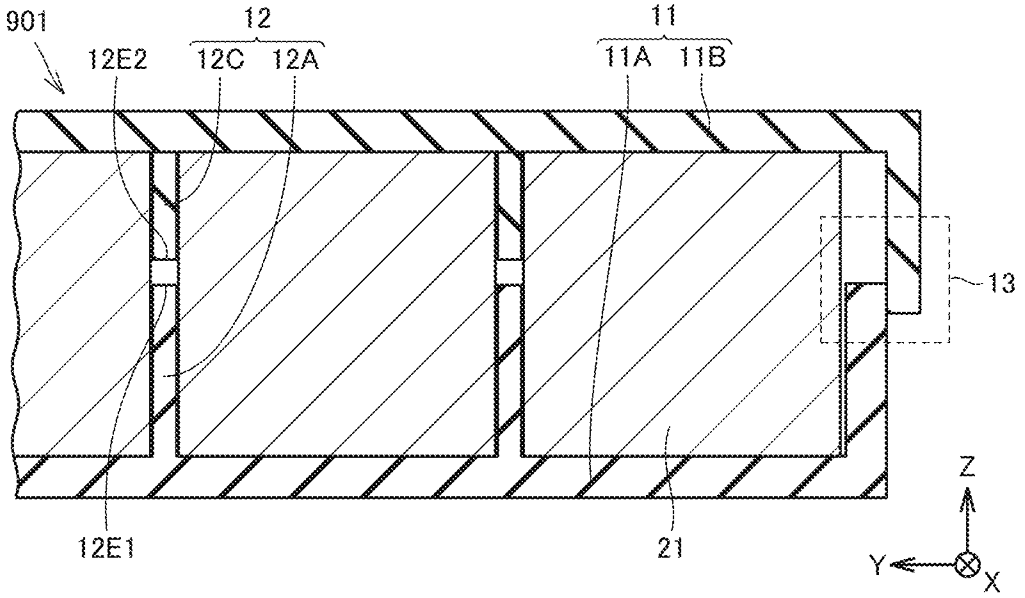
FIG. 26 is a schematic cross-sectional view of a part of a completed reactor according to the first example of the ninth embodiment.

FIG. 26 is a schematic cross-sectional view of a part of a completed reactor according to the first example of the ninth embodiment. Referring to FIG. 26, the reactor according to the first example of the ninth embodiment basically has the same configuration as those of reactors in the first and fourth embodiments. Thus, the same components as those in the first and fourth embodiments will be denoted by the same reference characters, and the description thereof will not be repeated. However, the present embodiment is different in configuration of partition 12 from the first and fourth embodiments.

Specifically, in reactor 901 in FIG. 26, first case 10 includes first case outer frame portion 11 and partition 12 as in the above-described embodiments such as the third embodiment. First case outer frame portion 11 is capable of accommodating a plurality of first core pieces 21. Partition 12 is disposed inside first case outer frame portion 11. In partition 12, a plurality of first case partition portions 12A disposed at a distance from each other are attached to a first case accommodating portion 11A and integrated with first case accommodating portion 11A. Partition 12 is attachable to and detachable from first case outer frame portion 11. A second case partition portion 12C as partition 12 is formed in first case cover portion 11B so as to be integrated with first case cover portion 11B. Particularly in reactor 901, first case partition portion 12A is formed in first case accommodating portion 11A, and second case partition portion 12C is formed in first case cover portion 11B. In other words, in reactor 901, a case partition portion is formed in each of first case accommodating portion 11A and first case cover portion 11B. First case partition portion 12A is the first portion formed integrally with first case accommodating portion 11A. Second case partition portion 12C is the second portion formed integrally with first case cover portion 11B. In this way, partition 12 can be formed integrally with each of first case accommodating portion 11A and first case cover portion 11B in the same manner as described above. Thus, first case partition portion 12A as partition 12 and first case accommodating portion 11A can be formed in the same process. Furthermore, second case partition portion 12C as partition 12 and first case cover portion 11B can be formed in the same process. Furthermore, even when a case partition portion is integrally formed in each of first case accommodating portion 11A and first case cover portion 11B, all of these components can be formed in the same process, so that the process can be simplified.

In FIG. 26, both first case partition portion 12A and second case partition portion 12C are disposed in a region sandwiched between a pair of first core pieces 21 adjacent to each other in the Y direction. The following is an explanation about a partition end portion 12E1 that is an end portion of first case partition portion 12A integrated with first case accommodating portion 11A, and that is located on the upper side in the Z direction on the side opposite to the side where first case partition portion 12A is integrated with first case accommodating portion 11A, i.e., on the lower side in the Z direction. Also, the following is an explanation about a partition end portion 12E2 that is an end portion of second case partition portion 12C integrated with first case cover portion 11B, and that is located on the lower side in the Z direction on the side opposite to the side where second case partition portion 12C is integrated with first case cover portion 11B, i.e., on the upper side in the Z direction. In this case, partition end portion 12E1 and partition end portion 12E2 are disposed to face each other in the Z direction. Partition end portion 12E1 and partition end portion 12E2 may be in contact with each other. However, the distance between partition end portions 12E1 and 12E2 is preferably 10% or less, and more preferably 5% or less, of the distance extending in the Z direction between the lowermost surface of first case accommodating portion 11A extending along an X-Y plane and the uppermost surface of first case cover portion 11B extending along the X-Y plane.

In FIG. 26, first case partition portion 12A and second case partition portion 12C overlap with each other in a plan view. In other words, first case partition portion 12A and second case partition portion 12C have substantially the same dimension in the X direction and also have substantially the same dimension in the Y direction. However, first case partition portion 12A and second case partition portion 12C may have the same dimension or different dimensions in the Z direction.

In reactor 901 in FIG. 26, a region between first core pieces 21 and the like adjacent to each other is filled with first case partition portion 12A and second case partition portion 12C. Thus, most of the region between the core pieces in the Z direction, i.e., 90% or more of the region, is filled with partition 12. Thus, substantially one circumference of each first core piece 21 in FIG. 26 is surrounded by partition 12 and first case outer frame portion 11. Accordingly, most of the circumferential region of each first core piece 21 is surrounded and held by first case outer frame portion 11 or partition 12. Thereby, the vibration resistance of reactor 901 is improved, for example, as compared with the configuration including only first case partition portion 12A on the first case accommodating portion 11A side as partition 12 as shown in FIG. 3.

For example, in the configuration shown in FIG. 3, partition 12 is not disposed but a wide range of a gap region exists between first core pieces 21 adjacent to each other. In this case, when strong vibrations are applied to reactor 101, the core pieces adjacent to each other in the Y direction may come into contact with each other in this gap region where no partition 12 is disposed. It is desirable to avoid such contact from the viewpoint of suppressing damage to the core pieces and changes in electrical characteristics. Thus, in the configuration as shown in FIG. 26, even when strong vibrations are applied, problems caused by contact or the like between a pair of adjacent core pieces are suppressed by first case partition portion 12A and second case partition portion 12C between the adjacent core pieces.

Figure 27:
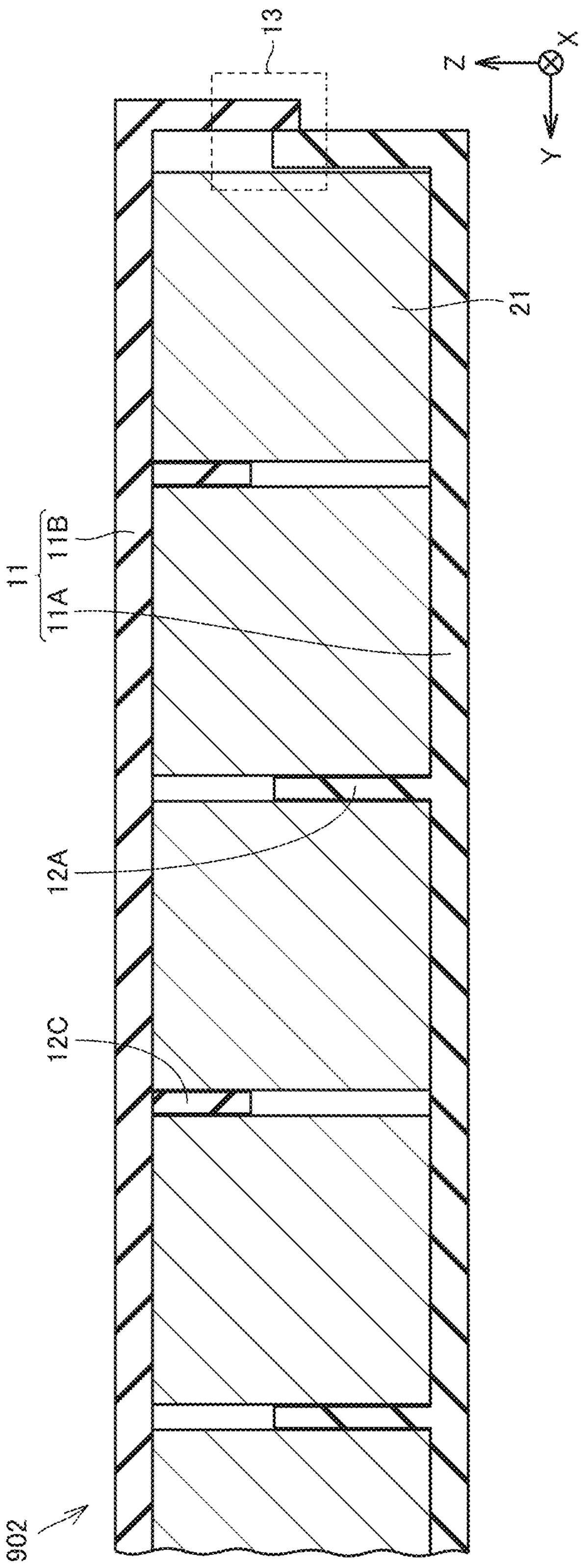
FIG. 27 is a schematic cross-sectional view of a part of a completed reactor according to the second example of the ninth embodiment.

FIG. 27 is a schematic cross-sectional view of a part of a completed reactor according to the second example of the ninth embodiment. Referring to FIG. 27, the reactor according to the second example of the ninth embodiment basically has the same configuration as that of the reactor according to the first example of the ninth embodiment. Thus, the same components as those in the first embodiment will be denoted by the same reference characters, and the description thereof will not be repeated. However, a reactor 902 in FIG. 27 has the following structural feature. Reactor 902 is provided with a plurality of gaps each as a region between a pair of first core pieces 21 adjacent to each other in the Y direction among the plurality of first core pieces 21. First case partition portion 12A as the first portion integrated with first case accommodating portion 11A and second case partition portion 12C as the second portion integrated with first case cover portion 11B are alternately disposed in the respective gaps in the Y direction in which these gaps are arranged. In other words, first case partition portions 12A and second case partition portions 12C are alternately disposed in the respective gaps arranged from the left side to the right side in the figure. Even such a configuration causes no particular functional problem in reactor 902. In other words, reactor 902 can also achieve desired electrical characteristics.

Figure 28:
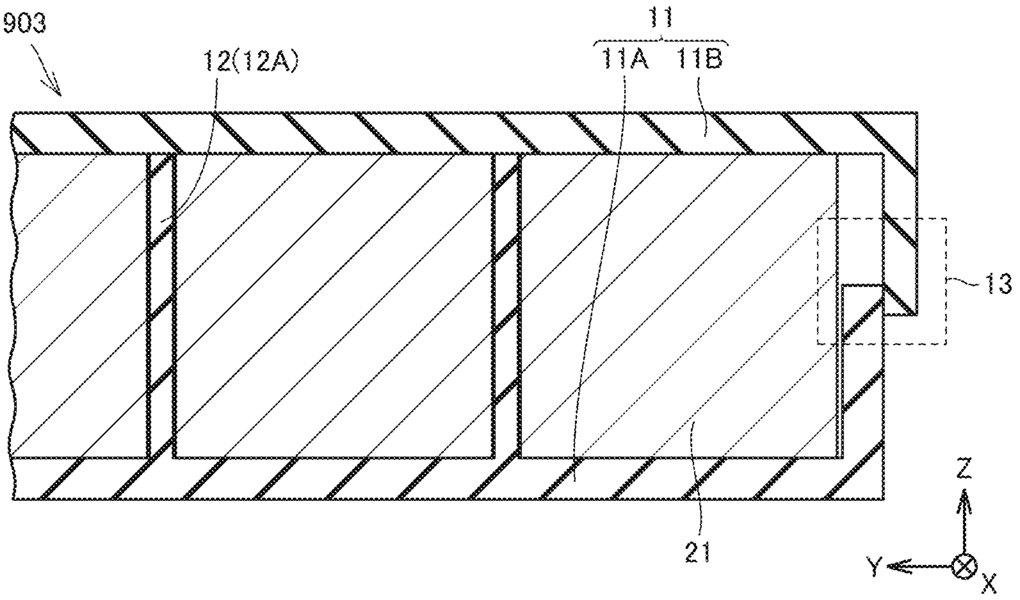
FIG. 28 is a schematic cross-sectional view of a part of a completed reactor according to the third example of the ninth embodiment.
Figure 29:
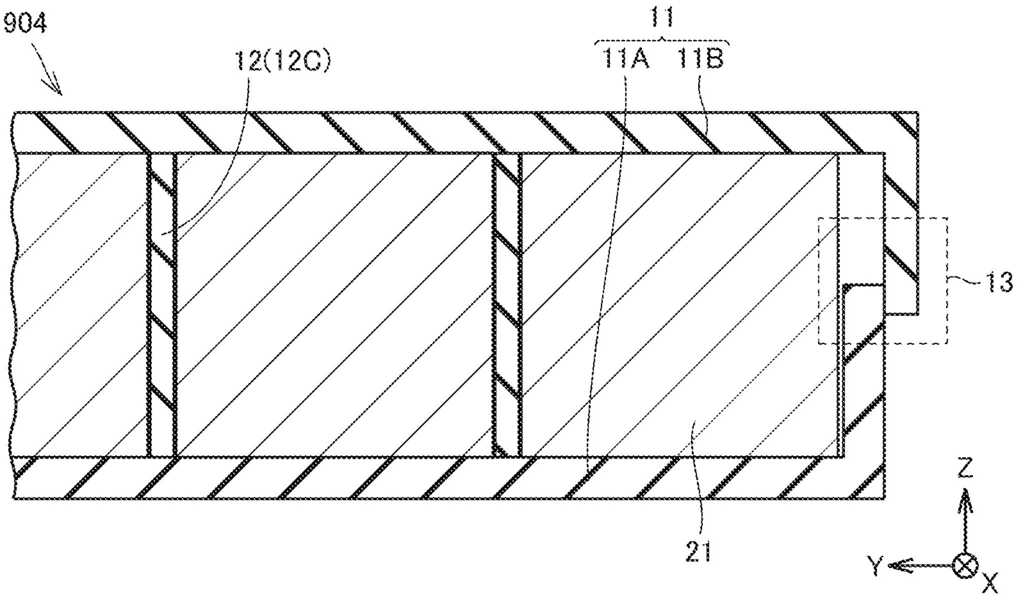
FIG. 29 is a schematic cross-sectional view of a part of a completed reactor according to the fourth example of the ninth embodiment.

FIG. 28 is a schematic cross-sectional view of a part of a completed reactor according to the third example of the ninth embodiment. FIG. 29 is a schematic cross-sectional view of a part of a completed reactor according to the fourth example of the ninth embodiment. Referring to FIG. 28, a reactor 903 has basically the same configuration as those of reactors 101 and 901. In reactor 903, first case partition portion 12A is disposed in each region between a pair of first core pieces 21 adjacent to each other in the Y direction, as in reactor 101. However, the length of first case partition portion 12A extending in the Z direction is longer in reactor 903 than in reactor 101. Reactor 903 is provided with first case partition portion 12A having a length equal to substantially the entire length of the region in the Z direction between one pair of first core pieces 21 adjacent to each other.

Referring to FIG. 29, reactor 904 has basically the same configuration as that of reactor 903. In reactor 904, second case partition portion 12C is disposed in each region between a pair of first core pieces 21 adjacent to each other in the Y direction. However, the length of second case partition portion 12C extending in the Z direction is longer in reactor 904 than in reactor 901. Reactor 904 is provided with second case partition portion 12C having a length equal to substantially the entire length of the region in the Z direction between a pair of first core pieces 21 adjacent to each other.

In reactors 903 and 904 shown in FIGS. 28 and 29, most of the region, i.e., 90% or more of the region, extending in the Z direction between first core pieces 21 and the like adjacent to each other is filled with partition 12, as in reactor 901 shown in FIG. 26. Thus, the effect of improving the vibration resistance of reactor 903, 904 can be achieved as in reactor 901 in FIG. 26.

FIGS. 26 to 29 each show an example in which first case accommodating portion 11A and first case cover portion 11B are fitted by snap-fit structure 13. However, the present invention is not limited thereto, but the present embodiment may also have a configuration in which first case accommodating portion 11A and first case cover portion 11B come into contact with each other at a first case contact portion 11C, around which a case fixing member 41 is wound from outside, for example, as shown in FIG. 3.

FIGS. 26 to 29 each also illustrate first case outer frame portion 11 of first case 10. However, the same configuration as that of partition 12 in the present embodiment may also be applied to second case 15 in FIGS. 21 and 22.

Tenth Embodiment

Figure 30:
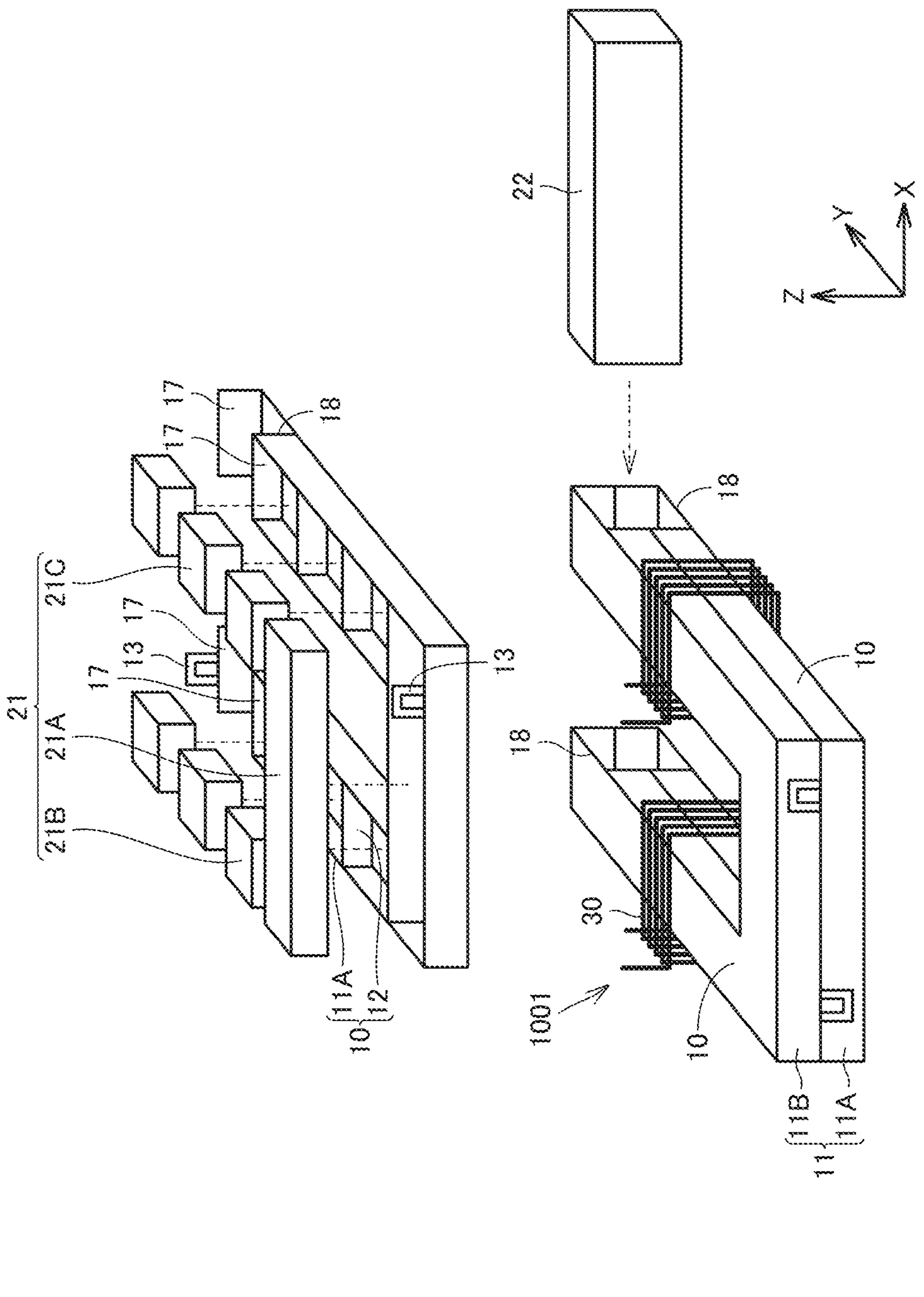
FIG. 30 is a schematic perspective view showing a manner in which a second core piece is inserted into a first case of a reactor according to the first example of the tenth embodiment.

FIG. 30 is a schematic perspective view showing a manner in which a second core piece is inserted into a first case of a reactor according to the first example of the tenth embodiment. Referring to FIG. 30, the present embodiment is different from the first and fourth embodiments in the configuration of the end portion of first case outer frame portion 11 as first case 10 having a U-shape in a plan view, which is located on the side opposite to the positive side in the Y direction in each of two portions extending in the Y direction, i.e., opposite to the side of the portion extending in the X direction.

Specifically, in the present embodiment in FIG. 30, a part of second core piece 22 is accommodated in first case 10. Such a part of second core piece 22 is one end portion and the other end portion of second core piece 22 extending in the X direction. However, the entire second core piece 22 may be accommodated inside first case 10. The inside of first case 10 is the first end portion of first case 10 that is an end portion on the positive side in the Y direction as the first direction in which a plurality of first core pieces 21B and 21C are arranged. At the first end portion of first case 10, one end portion and the other end portion of second core piece 22 extending in the X direction as the second direction intersecting the first direction are accommodated inside first case 10. In this regard, the present embodiment is different in configuration from the first embodiment in which second core piece 22 is not accommodated in first case 10.

Figure 31:
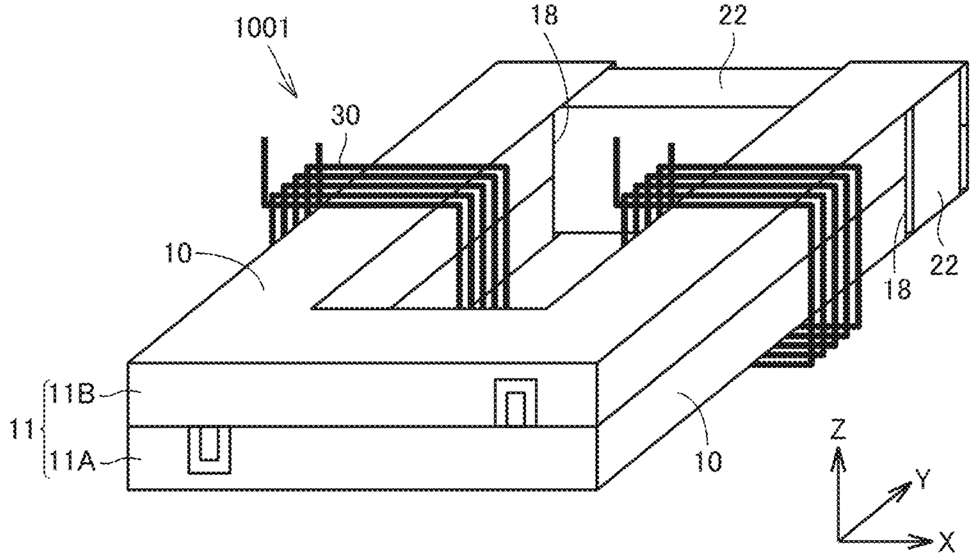
FIG. 31 is a schematic perspective view showing an external appearance of a completed reactor according to the first example of the tenth embodiment.

A region of first case accommodating portion 11A on the most positive side in the Y direction does not have a pair of outermost side surfaces extending in the Y direction and a pair of side surfaces on the inside thereof. Such regions not having side surfaces are provided as a pair of openings 18 on the outermost side and a pair of openings 18 on the inside thereof. Through these openings 18, in the X direction as shown by a dotted arrow in FIG. 30, second core piece 22 is introduced into and removed from the end portion of first case 10 on the positive side in the Y direction. In other words, second core piece 22 is inserted into the end portion on the positive side in the Y direction in first case 10 through opening 18 provided in the outermost side surface on the right side in the X direction, for example. In this case, second core piece 22 is inserted to move in the X direction so as to pass through a pair of inner openings 18. This state is shown as a reactor 1001 in FIG. 31. FIG. 31 is a schematic perspective view showing an external appearance of a completed reactor according to the first example of the tenth embodiment. Referring to FIG. 31, for example, in reactor 1001 in the state where second core piece 22 is inserted through outermost opening 18 on the right side in the X direction, in a region of first case 10 that is adjacent to the second end portion of second core piece 22 in the X direction, i.e., in at least one of outermost portions of first case 10, first case 10 has opening 18 through which second core piece 22 is inserted and removed. In FIGS. 30 and 31, a total of two pairs of openings 18 are provided such that one pair of openings 18 are located in the outermost portions in the X direction adjacent to one second end portion and the other second end portion of second core piece 22 in its extending direction, and such that one pair of openings 18 are located on the inside of these outermost portions. In this regard, the present embodiment is different in configuration from the fourth embodiment in which no opening 18 is provided in the outermost side surface in the X direction.

In completed reactor 1001 having second core piece 22 inserted thereto as shown in FIG. 31, it is preferable that a pair of openings 18 on the outermost side in the X direction in first case accommodating portion 11A are blocked by a tape or the like. Opening 18 may be blocked by any fixing member other than a tape. The pair of openings 18 on the outermost side in the X direction in first case accommodating portion 11A are blocked by a tape or the like, thereby leading to a configuration that is substantially the same configuration in which the side surface on the outermost side in the X direction in first case accommodating portion 11A is provided to reach the end portion on the positive side in the Y direction, as in the fourth embodiment.

As shown in FIG. 30, in a region accommodating second core piece 22 in the end portion on the positive side in the Y direction in first case outer frame portion 11, wall surfaces 17 are provided on one side and the other side in the first direction (the Y direction) in which a plurality of first core pieces 21B are arranged. Thus, in the present embodiment, second core piece 22 cannot be inserted from the positive side in the Y direction into the accommodating portion at the end portion on the positive side in the Y direction in first case outer frame portion 11. This is because second core piece 22 receives interference from wall surface 17. In this point, the present embodiment is different in configuration from the fourth embodiment in which wall surface 17 is not provided in the outermost end portion on the positive side in the Y direction, and second core piece 22 is inserted into first case 10 from the positive side in the Y direction.

According to the above-described configuration, reactor 1001 is provided with a closed magnetic path having a closed loop shape by first core piece 21 and second core piece 22 as in the reactors according to other embodiments.

Figure 32:
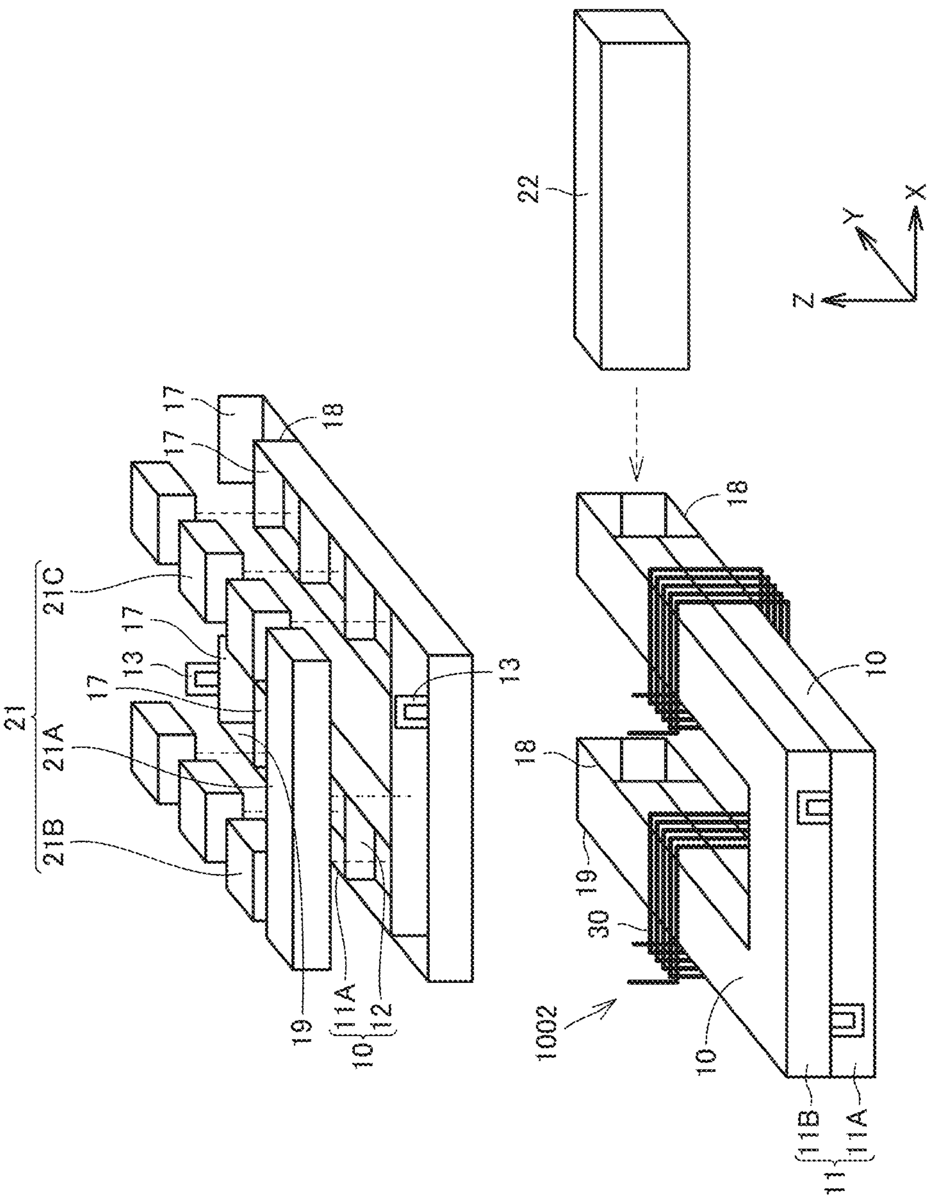
FIG. 32 is a schematic perspective view showing a manner in which a second core piece is inserted into a first case of a reactor according to the second example of the tenth embodiment.

FIG. 32 is a schematic perspective view showing a manner in which a second core piece is inserted into a first case of a reactor according to the second example of the tenth embodiment. Referring to FIG. 32, a reactor 1002 in the second example basically has the same configuration as that of reactor 1001. However, in reactor 1002, at least one of outermost portions of first case outer frame portion 11 in the second direction, i.e., the X direction, is provided with an opening 18 through which second core piece 22 is inserted and removed, as in FIG. 30. Note that a fixing wall portion 19 is disposed on the other outermost portion opposite to the one outermost portion of first case outer frame portion 11 in the X direction, for example, so as to face opening 18 in the X direction. Specifically, the other outermost portion is not provided with opening 18 but is blocked in the X direction by fixing wall portion 19. Fixing wall portion 19 may be a part of an outermost side surface extending in the Y direction in first case outer frame portion 11, for example.

In FIG. 32, one outermost portion in the X direction is located on the right side in the figure while the other outermost portion is located on the left side in the figure. Thus, opening 18 is provided on the right side in the figure while fixing wall portion 19 is formed on the left side in the figure, but on the contrary, one outermost portion in the X direction may be provided on the left side in the figure while the other outermost portion may be provided on the right side in the figure, though not shown. In this case, opening 18 is provided on the left side in the figure while fixing wall portion 19 is formed on the right side in the figure.

In each example of the present embodiment shown in FIGS. 30 to 32, in first case outer frame portion 11 of first case 10, first case accommodating portion 11A and first case cover portion 11B preferably have substantially the same U-shape in a plan view. In this state, the productivity can be improved as compared with the case where first case accommodating portion 11A and first case cover portion 11B have different shapes. In this case, however, first case accommodating portion 11A and first case cover portion 11B are preferably fixed by a fixing member. In this case, the fixing member is preferably attached to one end portion and the other end portion of first case accommodating portion 11A in the Y direction intersecting the X direction in which second core piece 22 is inserted. As the fixing member, for example, a snap-fit structure 13 is attached in FIGS. 30 to 32. However, a member other than snap-fit structure 13 may be used as a fixing member. In this state, the fixing member for fixing first case accommodating portion 11A and first case cover portion 11B can be prevented from interfering with second core piece 22 when second core piece 22 is inserted.

Reactors 1001 and 1002 in the tenth embodiment basically have the same configuration as those of the reactors in the first to ninth embodiments other than the above. In the following, the same main points as those in the first to ninth embodiments will be described again. The following explanation about a modification of reactor 1001 is also applicable to reactor 1002.

Reactor 1001 in the tenth embodiment mainly includes a first case 10, a core piece 20, and a coil 30. First case 10 is shaped as a part of a closed loop formed by core piece 20 of reactor 101 or shaped as a part of a closed magnetic path having a closed loop shape. Core piece 20 includes a plurality of first core pieces 21 and a second core piece 22. The plurality of first core pieces 21 are disposed inside first case 10.

In reactor 1001, second core piece 22 is disposed to form a closed magnetic path having a substantially rectangular closed loop shape, together with a plurality of first core pieces 21A, 21B, and 21C accommodated in first case 10, i.e., in first case outer frame portion 11. The above-mentioned substantially rectangular closed loop shape means that it seems as a substantially rectangular closed loop in a plan view, for example, by ignoring: a gap between a pair of first core pieces 21B adjacent to each other in the Y direction among the plurality of first core pieces 21B; and a positional displacement between the pair of adjacent first core pieces 21B in the X direction.

Coil 30 is wound, for example, around a part of core piece 20 shown in FIG. 1 as a closed magnetic path. More specifically, coil 30 is wound around a portion of first case outer frame portion 11 in which first core pieces 21B disposed therein extend in the Y direction.

A plurality of first core pieces 21 and a partition 12 to separate a pair of adjacent first core pieces 21 among the plurality of first core pieces 21 are disposed inside first case outer frame portion 11 as an outer frame of first case 10. More specifically, first core piece 21A included in first core piece 21 is accommodated in a portion inside first case accommodating portion 11A, in which first case outer frame portion 11 as first case 10 extends in the X direction. The plurality of first core pieces 21B, 21C are accommodated in a portion inside first case accommodating portion 11A, in which first case outer frame portion 11 as first case 10 extends in the Y direction. Partition 12 serves to separate a pair of adjacent first core pieces 21A, 21B, 21C among the plurality of first core pieces 21A, 21B, 21C inside first case outer frame portion 11, i.e., inside first case accommodating portion 11A.

First case outer frame portion 11 includes: first case accommodating portion 11A as a portion of first case outer frame portion 11 capable of accommodating the plurality of first core pieces 21A, 21B, and 21C; and first case cover portion 11B to cover a space inside first case accommodating portion 11A. In FIG. 31, first case cover portion 11B has substantially the same shape as that of first case accommodating portion 11A in a plan view, and is disposed so as to entirely cover core piece 20 including second core piece 22.

Also in reactor 1001 in the present embodiment, it is preferable that first case accommodating portion 11A and first case cover portion 11B are fitted by a fitting mechanism referred to as a so-called snap-fit structure 13, as shown in a region surrounded by a dotted line in FIG. 5.

In reactor 1001 in the present embodiment, it is preferable that a pair of adjacent first core pieces 21B separated by partition 12 face each other with a gap interposed therebetween, for example, as indicated by dimensions GP2 and GP3 in FIG. 12. A plurality of core gaps each are provided as a distance between each of the plurality of partitions 12 and a corresponding one of first core pieces 21B adjacent thereto in the Y direction. In this case, it is preferable that at least one of the plurality of core gaps has a space in the Y direction.

In reactor 1001 in the present embodiment, for example, as in FIG. 12, among the plurality of first core pieces 21B, 21C disposed with the respective partitions 12 interposed therebetween, a distance between one pair of adjacent first core pieces may be different from a distance between another pair of adjacent first core pieces. The above-mentioned distance between one pair of adjacent first core pieces is a distance between first core pieces 21B1 and 21B2, for example. The above-mentioned distance between another pair of adjacent first core pieces is a distance between first core pieces 21B2 and 21B3, for example.

Also in the present embodiment, a plurality of ribs 11E are formed inside first case outer frame portion 11, for example, as shown in FIG. 13. Ribs 11E are a plurality of thin and small-sized members that are attached on the inner wall surface of first case outer frame portion 11, particularly on the inner side surface, at a distance from each other in the Y direction, for example. A thin plate-like partition 12 is inserted into a groove-shaped space portion sandwiched, for example, between a pair of ribs 11E adjacent to each other in the Y direction among the plurality of ribs 11E. Partition 12 is disposed arbitrarily detachably inside a region of a plurality of groove-shaped space portions sandwiched between ribs 11E.

Also in the present embodiment, first case 10 includes first case outer frame portion 11 and partition 12 as in other embodiments. First case outer frame portion 11 is capable of accommodating a plurality of first core pieces 21. Partition 12 is disposed inside first case outer frame portion 11. In partition 12, for example, as shown in FIG. 14, a plurality of first case partition portions 12A disposed at a distance from each other are attached to partition base portion 12B and integrated with partition base portion 12B. Partition 12 including partition base portion 12B and the plurality of first case partition portions 12A integrally attached thereto is attachable to and detachable from first case outer frame portion 11.

Also in reactor 1001 in the present embodiment, as shown in FIG. 26, first case 10 includes first case outer frame portion 11 and partition 12. First case outer frame portion 11 is capable of accommodating a plurality of first core pieces 21. Partition 12 is disposed inside first case outer frame portion 11. In partition 12, a plurality of first case partition portions 12A disposed at a distance from each other are attached to first case accommodating portion 11A and integrated with first case accommodating portion 11A. Partition 12 is attachable to and detachable from first case outer frame portion 11. A second case partition portion 12C as partition 12 is formed in first case cover portion 11B so as to be integrated with first case cover portion 11B. Such a configuration may also be adopted. In this case, in reactor 1001, first case partition portion 12A is formed in first case accommodating portion 11A, and second case partition portion 12C is formed in first case cover portion 11B. In other words, in reactor 1001, a case partition portion is formed in each of first case accommodating portion 11A and first case cover portion 11B.

In reactor 1001 in the present embodiment, first case partition portion 12A is the first portion formed integrally with first case accommodating portion 11A. Second case partition portion 12C is the second portion formed integrally with first case cover portion 11B. Such a configuration may also be adopted.

Also in reactor 1001 in the present embodiment, as shown in FIG. 27, a plurality of gaps each are provided as a region between a pair of first core pieces 21 adjacent to each other in the Y direction among the plurality of first core pieces 21. First case partition portion 12A as the first portion integrated with first case accommodating portion 11A and second case partition portion 12C as the second portion integrated with first case cover portion 11B are alternately disposed in the respective gaps in the Y direction in which these gaps are arranged. Such a configuration may also be adopted.

Also in the present embodiment, at least one of buffer member 43 and adhesive agent 44 is disposed inside first case outer frame portion 11, for example, as shown in FIG. 9. First case outer frame portion 11 and the plurality of first core pieces 21 are joined by at least one of buffer member 43 and adhesive agent 44. Thus, both buffer member 43 and adhesive agent 44 may be disposed inside first case outer frame portion 11. Also, first case outer frame portion 11 and the plurality of first core pieces 21 may be joined by both buffer member 43 and adhesive agent 44.

As shown in FIG. 16, reactor 1001 in the present embodiment may also further include a bobbin portion 40 disposed outside first case outer frame portion 11 as first case 10. In this case, coil 30 is wound around the outside of bobbin portion 40.

Also in reactor 1001 in the present embodiment, first case outer frame portion 11 may be provided with opening portions 14 in at least one pair of surfaces facing each other with the respective first core pieces 21B, 21C interposed therebetween. Thus, as shown in FIGS. 17 and 18, opening portions 14 may be provided in the lowermost surface in the Z direction in first case accommodating portion 11A and at a position of first case cover portion 11B that faces this lowermost surface. Alternatively, opening portions 14 may be provided, for example, in some of regions such as a central portion in a plan view, for example, in each of regions corresponding to a pair of side surfaces facing each other in each region separated by partition 12 in first case accommodating portion 11A.

Then, the functions and effects of the present embodiment will be described. As described above, reactor 1001 in the present embodiment includes first case 10, a plurality of first core pieces 21, second core pieces 22, and coil 30. First case 10 is shaped as a part of a closed loop. The plurality of first core pieces 21 are disposed inside first case 10. Second core piece 22 is disposed so as to form a closed magnetic path having a closed loop shape, together with the plurality of first core pieces 21 inside first case 10. Coil 30 is wound around the closed magnetic path. A plurality of first core pieces 21B (21C) and a partition 12 that separates a pair of adjacent first core pieces 21B (21C) among the plurality of first core pieces 21B (21C) are disposed inside first case outer frame portion 11 as an outer frame of first case 10. At the first end portion of first case 10 in the first direction (the Y direction) in which the plurality of first core pieces 21B (21C) are arranged, at least a part of second core piece 22 is accommodated in first case 10 so as to extend in the second direction (the X direction) intersecting the first direction. In at least one of the outermost portions of first case 10 adjacent to the second end portion in the second direction in second core piece 22 accommodated in first case 10, first case 10 is provided with an opening 18 through which second core piece 22 is inserted and removed. First case outer frame portion 11 includes: first case accommodating portion 11A as a portion of first case outer frame portion 11 that is capable of accommodating a plurality of first core pieces 21;

and first case cover portion 11B to cover a space inside first case accommodating portion 11A.

Also in the present embodiment, the outer dimensions of first case outer frame portion 11 are defined, and first core piece 21 and second core piece 22 are accommodated therein. Only thereby, the total sum value of the core gaps between the plurality of first core pieces 21 and between first core piece 21 and second core piece 22 can be managed. This eliminates the need to precisely manage each core gap between first core pieces 21 and the like. Furthermore, it is not necessary to fix each first core piece 21 and the like by using complex mechanical components. Reactor 1001 can be readily produced only by using first case outer frame portion 11 having partition 12. In other words, the productivity of reactor 1001 can be significantly improved.

As described above, in the present embodiment, at least a part of second core piece 22, in particular, an end portion of second core piece 22 in its extending direction, is accommodated in first case 10. First case 10 is provided with an opening 18 through which second core piece 22 is introduced and removed. In this manner, not only first core piece 21 but also second core piece 22 forming a closed magnetic path is disposed inside first case 10. Thus, fixation of second core piece 22 to first case outer frame portion 11 can be further simplified. For example, in reactor 1001, wall surfaces 17 are disposed such that second core piece 22 is sandwiched therebetween in the Y direction. Thereby, second core piece 22 receives interference from wall surface 17 in the Y direction, so that second core piece 22 is more reliably fixed in the Y direction.

For example, in reactor 1001, a fixing member such as a tape is disposed so as to close opening 18 in the X direction. Thereby, particularly in the X direction, the end portion of second core piece 22 in its extending direction receives interference from the fixing member such as a tape, so that second core piece 22 is more reliably fixed in the X direction. Thus, the strength of fixing second core piece 22 to first case outer frame portion 11 can be improved.

In the present embodiment, for example, as in reactor 1002, opening 18 is provided in one of the outermost portions of first case outer frame portion 11 in the second direction, for example, in the outermost portion on the right side. Also, a fixing wall portion 19 is formed in the other outermost portion of first case outer frame portion 11 in the second direction that is on the opposite side of the one outermost portion, for example, in the outermost portion on the left side. It is sufficient to provide at least one opening 18 in one of the outermost portions in order to allow insertion and removal of second core piece 22. Also, by forming a fixing wall portion 19 in the other outermost portion, the number of openings 18 to be blocked after insertion of second core piece 22 can be reduced as compared with the case where openings 18 are provided in both one outermost portion and the other outermost portion. Thus, second core piece 22 can be more readily fixed in the X direction. In other words, only opening 18 in one of the outermost portions may be closed and fixed with a tape or the like after insertion of second core piece 22. Thereby, second core piece 22 can be readily fixed and reactor 1002 can be readily formed as compared with the case where openings 18 are provided in both one outermost portion and the other outermost portion. In reactor 1002, since second core piece 22 receives interference from fixing wall portion 19 in the X direction, second core piece 22 is more reliably fixed in the X direction.

Other functions and effects are the same as those in the first embodiment, but the main points thereof will be described again. In reactor 1001 in the present embodiment, it is preferable that a pair of adjacent first core pieces 21B (21C) separated by partition 12 face each other with a gap interposed therebetween. In this state, the total sum of the core gaps as distances between the plurality of first core pieces 21B and the like is automatically set by the outer dimensions of first case 10 including partition 12. Thus, without having to pay particular attention during introduction of each first core piece 21B into first case 10, the total sum of the core gaps can be readily set and the characteristics such as an inductance of reactor 1001 can be determined. Accordingly, reactor 1001 can be readily produced.

In reactor 1001 in the present embodiment, a plurality of ribs 11E are formed at a distance from each other inside first case outer frame portion 11. Partition 12 is detachably disposed between a pair of ribs 11E adjacent to each other among the plurality of ribs 11E. Such a configuration may also be adopted. In this state, the position at which partition 12 is disposed can be changed by ribs 11E inside first case outer frame portion 11. In other words, the versatility of the state inside first case outer frame portion 11 can be enhanced. Thus, even when the size of first core piece 21 is changed, the degree of freedom for accommodating first core piece 21 inside first case outer frame portion 11 is increased by changing the position where partition 12 is placed.

In reactor 1001 in the present embodiment, first case 10 includes: first case outer frame portion 11 capable of accommodating a plurality of first core pieces 21; and partition 12 disposed inside first case outer frame portion 11 and attachable to and detachable from first case outer frame portion 11. Such a configuration may also be adopted. For example, as shown in FIG. 14, partition 12 includes a plurality of first case partition portions 12A integrated with each other at a distance from each other. Thereby, as in the second and third embodiments, partition 12 can be detachable from first case outer frame portion 11. Thus, for example, when first core piece 21 is a small-sized piece, partition 12 is placed in first case outer frame portion 11, and thereafter, first core piece 21 can be accommodated in first case outer frame portion 11. Also, when first core piece 21 is a large-sized piece, first core piece 21 can be accommodated directly in first case outer frame portion 11 in the state where no partition 12 is placed.

In reactor 1001 in the present embodiment, first case 10 includes: first case outer frame portion 11 capable of accommodating a plurality of first core pieces 21; and partition 12 disposed inside first case outer frame portion 11 and attachable to and detachable from first case outer frame portion 11. Partition 12 includes a plurality of first case partition portions 12A integrated with each other at a distance from each other. A second case partition portion 12C as partition 12 is formed in first case cover portion 11B so as to be integrated with first case cover portion 11B. First case partition portion 12A is the first portion formed integrally with first case accommodating portion 11A. Second case partition portion 12C is the second portion formed integrally with first case cover portion 11B. Such a configuration may also be adopted. In this manner, partition 12 can be formed integrally with each of first case accommodating portion 11A and first case cover portion 11B. Thus, first case partition portion 12A as partition 12 and first case accommodating portion 11A can be formed in the same process. Also, second case partition portion 12C as partition 12 and first case cover portion 11B can be formed in the same process. Furthermore, also when a case partition portion is integrally formed in each of first case accommodating portion 11A and first case cover portion 11B, all of these components can be formed in the same process, so that the process can be simplified.

Reactor 1001 in the present embodiment is provided with a plurality of gaps each as a region between a pair of first core pieces 21 adjacent to each other in the Y direction among the plurality of first core pieces 21. First case partition portion 12A as the first portion integrated with first case accommodating portion 11A and second case partition portion 12C as the second portion integrated with first case cover portion 11B are alternately disposed in the respective gaps in the Y direction in which these gaps are arranged. In other words, first case partition portions 12A and second case partition portions 12C are alternately arranged in the respective gaps arranged from the left side to the right side in the figure. Even such a configuration causes no particular functional problem in reactor 1001. In other words, reactor 1001 can also achieve desired electrical characteristics.

Also in reactor 1001 in the present embodiment, it is preferable that first case accommodating portion 11A and first case cover portion 11B are fitted, for example, by snap-fit structure 13 as a fitting mechanism. Thus, the strength of fitting between first case accommodating portion 11A and first case cover portion 11B is higher in reactor 1002 than in reactor 1001. Also thereby, the vibration resistance of reactor 1002 can be improved.

Also in reactor 1001 in the present embodiment, at least one of buffer member 43 and adhesive agent 44 is disposed inside first case outer frame portion 11. First case outer frame portion 11 and the plurality of first core pieces 21 are joined by at least one of buffer member 43 and adhesive agent 44. Such a configuration may also be adopted. Thus, first case outer frame portion 11 and first core piece 21 can be joined with sufficient strength.

Reactor 1001 in the present embodiment further includes a bobbin portion 40 disposed outside first case outer frame portion 11 as first case 10. Coil 30 is wound around the outside of bobbin portion 40. Such a configuration may also be adopted. By using bobbin portion 40, a complicated process does not need to be performed for stabilizing the shape of the wire and the like. In view of the above, according to the present embodiment, the production efficiency particularly for a portion corresponding to coil 30 in the reactor can be improved.

In reactor 1001 in the present embodiment, first case outer frame portion 11 is provided with opening portions 14 located in at least one pair of surfaces facing each other with the respective first core pieces 21B, 21C interposed therebetween. Such a configuration may also be adopted. This can achieve an effect of efficiently cooling first core piece 21 and the like, and an effect of facilitating visual recognition, for example, as to whether cracking occurs or not in first core piece 21.

Also in reactor 1001 in the present embodiment, among the plurality of first core pieces 21B or 21C disposed with the respective partitions 12 interposed therebetween, a dimension GP2 as a distance between one pair of adjacent first core pieces 21B or 21C may be different from a dimension GP3 as a distance between another pair of adjacent first core pieces 21B or 21C for example, as shown in FIG. 12. This also causes no functional problem in reactor 1001.

The features described in (the examples included in) the embodiments set forth above may be applied in appropriate combination within the range where technical inconsistency does not occur.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

10 first case, 11 first case outer frame portion, 11A first case accommodating portion, 11B first case cover portion, 11C first case contact portion, 11D case end portion, 11E rib, 11F end portion, 12 partition, 12A first case partition portion, 12B partition base portion, 12C second case partition portion 12E1, 12E2 partition end portion, 13 snap-fit structure, 14 opening portion, 15 second case, 16 second case outer frame portion, 16A second case accommodating portion, 16B second case cover portion, 17 wall surface, 18 opening, 19 fixing wall portion, 20 core piece, 21, 21A, 21B, 21C, first core piece, 22 second core piece, 30 coil, 31 fixing member, 40 bobbin portion, 41 case fixing member, 42 protrusion shape, 43 buffer member, 44 adhesive agent, 51 heat conduction member, 52 housing, 53 substrate 101, 102, 103, 401, 601, 701, 801, 901, 902, 903, 904, 1001, 1002 reactor, MF magnetic flux, HT heat conduction path, WD cooling air.

The invention claimed is:

1. A reactor comprising:

a first case shaped to form a part of a closed loop, the first case having an outer frame;

a plurality of first core pieces disposed inside the first case;

a second core piece disposed to form a closed magnetic path together with the first core pieces inside the first case, the closed magnetic path having a closed loop shape; and a coil wound around the closed magnetic path, wherein a plurality of partitions are arranged inside the outer frame to separate an accommodating region in which the first core pieces are disposed, the first case accommodates at least a part of the second core piece, and the accommodating region is larger than the first core pieces in a plan view for allowing the first core pieces to move in an extending direction of the closed magnetic path.

2. The reactor according to claim 1, wherein the first case outer frame portion includes a first case cover to cover a space inside the first case accommodating portion.

3. The reactor according to claim 2, wherein the plurality of partitions are each disposed inside the first case outer frame, the plurality of partitions include a plurality of first case partitions integrated with each other at a distance from each other, and a plurality of second case partitions formed in the first case cover to be integrated with the first case cover.

4. The reactor according to claim 3, wherein the first case partitions each are a first portion integrally formed in the first case accommodating region, and the second case partitions are a second portion integrally formed in the first case cover.

5. The reactor according to claim 4, wherein a plurality of gaps each are provided as a region between a pair of adjacent first core pieces among the first core pieces, and the first portion and the second portion are alternately disposed in the respective gaps in a direction in which the gaps are arranged.

6. The reactor according to claim 2, wherein the first case accommodating region and the first case cover are fitted to each other by a fitting mechanism.

7. The reactor according to claim 1, wherein the plurality of partitions are each disposed inside the first case outer frame and attachable to and detachable from the first case outer frame, and the plurality of partitions include a plurality of first case partitions integrated with each other at a distance from each other.

8. The reactor according to claim 1, wherein the accommodating region is longer in an extending direction of the closed loop than the first core pieces accommodated in the accommodating region.

9. The reactor according to claim 1, wherein a first gap is provided in an extending direction of the closed loop between each of the plurality of partitions and a corresponding one of the first core pieces accommodated in the accommodating region.

10. The reactor according to claim 1, wherein the first core pieces and the second core piece each are made of any one of an Mn—Zn alloy and an Ni—Zn alloy.

11. The reactor according to claim 1, wherein a pair of adjacent first core pieces separated by a corresponding one of the partitions face each other with a second gap interposed therebetween.

12. The reactor according to claim 1, wherein a plurality of ribs are formed at a distance from each other inside the first case outer frame, and each of the plurality of partitions is detachably disposed between a pair of ribs adjacent to each other among the plurality of ribs.

13. The reactor according to claim 1, wherein at least one of a buffer member and an adhesive agent is disposed inside the first case outer frame, and the first case outer frame and the first core pieces are joined by at least one of the buffer member and the adhesive agent.

14. The reactor according to claim 1, further comprising a bobbin disposed outside the first case, wherein the coil is wound around an outside of the bobbin.

15. The reactor according to claim 1, wherein the first case outer frame has surfaces facing each other with a corresponding one of the first core pieces interposed therebetween, and at least one pair of the surfaces each are provided with an opening portion.

16. The reactor according to claim 1, wherein among the first core pieces disposed such that a corresponding one of the plurality of partitions is interposed between each pair of the first core pieces, a distance between one pair of adjacent first core pieces is different from a distance between another pair of adjacent first core pieces.

17. A reactor comprising:

a first case shaped to form a part of a closed loop, the first case having an outer frame;

a plurality of first core pieces disposed inside the first case;

a second core piece disposed to form a closed magnetic path together with the first core pieces inside the first case, the closed magnetic path having a closed loop shape; and a coil wound around the closed magnetic path, wherein a plurality of partitions are arranged inside the outer frame to separate an accommodating region in which the first core pieces are disposed, the first case accommodates at least a part of the second core piece such that, at a first end portion of the first case in a first direction in which the first core pieces are arranged, at least a part of the second core piece is accommodated in the first case so as to extend in a second direction intersecting the first direction, the first case is provided with an opening through which the second core piece is introduced and removed in the second direction, the opening being located in at least one of outermost portions of the first case that are adjacent to a second end portion in the second direction in the second core piece accommodated in the first case, and the accommodating region is larger than the first core pieces in a plan view so as to allow the first core pieces to move in an extending direction of the closed magnetic path.

18. The reactor according to claim 17, wherein the opening is provided in one outermost portion of the first case outer frame portion in the second direction, and a fixing wall is formed in the other outermost portion of the first case outer frame portion on a side opposite to the one outermost portion in the second direction.

* * * * *